(12) United States Patent
Hochberg et al.

(10) Patent No.: US 8,380,016 B1
(45) Date of Patent: Feb. 19, 2013

(54) GEOMETRIES FOR ELECTROOPTIC MODULATION WITH $\chi^2$ MATERIALS IN SILICON WAVEGUIDES

(75) Inventors: Michael Hochberg, Seattle, WA (US); Thomas W. Baehr-Jones, Seattle, WA (US)

(73) Assignee: University of Washington through its Center for Commercialization, Seattle, WA (US)

(*) Notice: Subject to any disclaimer, the term of this patent is extended or adjusted under 35 U.S.C. 154(b) by 47 days.

(21) Appl. No.: 12/796,999

(22) Filed: Jun. 9, 2010

Related U.S. Application Data

(60) Provisional application No. 61/268,173, filed on Jun. 9, 2009.

(51) Int. Cl.
*G02B 6/10* (2006.01)
*G02B 6/26* (2006.01)
*G02B 6/34* (2006.01)
*G02F 1/035* (2006.01)

(52) U.S. Cl. .............. 385/3; 385/40; 385/131

(58) Field of Classification Search .......... 385/1–3, 385/14, 40, 42, 129–132, 122
See application file for complete search history.

(56) References Cited

U.S. PATENT DOCUMENTS

| | | | | |
|---|---|---|---|---|
| 7,373,058 | B2* | 5/2008 | Hochberg et al. | 385/122 |
| 7,424,192 | B2* | 9/2008 | Hochberg et al. | 385/122 |
| 7,424,792 | B1* | 9/2008 | Sorkin | 52/223.13 |
| 7,609,932 | B1* | 10/2009 | Spillane | 385/132 |
| 7,894,696 | B2* | 2/2011 | Baehr-Jones et al. | 385/122 |
| 2007/0009200 | A1* | 1/2007 | Hochberg et al. | 385/15 |
| 2008/0002992 | A1* | 1/2008 | Hochberg et al. | 398/200 |
| 2009/0022445 | A1* | 1/2009 | Hochberg et al. | 385/3 |

* cited by examiner

*Primary Examiner* — Brian Healy
*Assistant Examiner* — Mary El Shammaa

(57) ABSTRACT

An apparatus for providing electrooptic modulation. The apparatus includes electrical contacts, a waveguide coupled between the electrical contacts, and a nonlinear optical material positioned in the slot region. The waveguide includes a first arm and a second arm that are each arranged to define a slot region for confining an optical mode. The slot region has a height, t1, and each of the first arm and the second arm include a strip load region having a height that is less than the height, t1, of the slot region. Each of the first arm and the second arm is configured to provide an electrical signal to the slot region via at least one of the electrical contacts. In one embodiment, the nonlinear optical material includes a $\chi^2$-based material. In another embodiment, each of the first arm and the second arm have an "L"-type shape.

20 Claims, 22 Drawing Sheets

GEOMETRIES FOR ELECTROOPTIC MODULATION WITH $\chi^2$ MATERIALS IN SILICON WAVEGUIDES

CROSS-REFERENCE TO RELATED APPLICATIONS

This application claims priority to and the benefit of co-pending U.S. provisional patent application Geometries for Electrooptic Modulation with $\chi 2$ Materials in Silicon Waveguides Ser. No. 61/268,173, filed Jun. 9, 2009, which is incorporated herein by reference in its entirety.

FIELD OF THE INVENTION

The invention relates to electrooptic modulation in general and particularly to slot waveguides configured for electrooptic modulation.

BACKGROUND OF THE INVENTION

A slot waveguide is an optical waveguide that guides light and strongly confines the guided light by capitalizing on the discontinuity of an electric field at high-refractive-index-contrast interfaces. A slot waveguide typically includes two regions of high-refractive-index material separated by a gap, or slot, having a low-refractive-index. The high-refractive-index material is typically covered by a cladding material.

Nonlinear electrooptic polymers can be used as a cladding material and can also be simultaneously incorporated into the slot of the slot waveguide. Basically, the use of such materials allows for a sufficiently high power flux (or "fluence," a term of art) in the material by exciting nonlinear behavior, meaning that the properties of the material change with the input optical power. This kind of effect is very often described through the use of, for instance Chi$^2$ ($\chi^2$) and Chi$^3$ ($\chi^3$) which are material dependent constants that describe the strength of two of the relevant nonlinear optical activities of a material. Some nonlinearities, which are material dependent, will work at the full optical frequency, while others are slower. Recently, engineered organic materials have begun to be used for nonlinear optics, because they can be designed to have extremely large $\chi^2$ and $\chi^3$ moments.

SUMMARY OF THE INVENTION

In one aspect, the invention relates to a slot waveguide for providing electrooptic modulation at exceptionally low drive voltage. The apparatus includes electrical contacts, a waveguide coupled between the electrical contacts, and a nonlinear optical material positioned in the slot region. The waveguide includes a first arm and a second arm that are each arranged to define a slot region for confining an optical mode. The slot region has a height, t1, and each of the first arm and the second arm include a strip load region having a height that is less than the height, t1, of the slot region. Each of the first arm and the second arm is configured to provide an electrical signal to the slot region via at least one of the electrical contacts.

In one embodiment, the nonlinear optical material includes a $\chi^2$ material, such as a $\chi^2$ polymer.

In another embodiment, each of the first arm and the second arm have an "L"-type shape.

In yet another embodiment, the substrate includes silicon and silicon oxide positioned between the silicon and the waveguide.

In yet another embodiment, the slot region includes a slot positioned between the first arm and the second arm with the nonlinear optical material positioned in the slot. The slot, for example, may have a width in the rage of 10 nm to 400 nm.

In yet another embodiment, the height of each of the strip load regions is in the range of 10 to 250 nm, and the height t1 of the slot region is in the range of 100 to 600 nm.

In yet another embodiment, the electrical contacts at least partially project over a surface of the first arm and another surface of the second arm.

In yet another embodiment, the electrical contacts include metal and have a height of at least 1.5 um.

In yet another embodiment, the strip load region of the first arm includes a p-type portion and the strip load region of the second arm includes an n-type portion. In yet another embodiment, the p-type portion includes a p+ portion and a p++ portion between the p+ portion and one of the electrical contacts and the n-type portion includes an n+ portion and an n++ portion between the n+ portion and another one of the electrical contacts.

In yet another embodiment, the slot region includes an n-type region and a p-type region separated from the n-type region by a slot.

In yet another embodiment, a Mach-Zehnder device incorporates an embodiment of slot waveguide.

In yet another embodiment, the Mach-Zehnder device includes another waveguide adjacent the waveguide. The other waveguide includes arms defining another slot region, the arms having a height that is less than a height of the other slot region. In yet another embodiment, the waveguide of Mach-Zehnder device has strip load regions of different doping type and the other waveguide has strip load regions of different doping type; the strip load regions of the waveguide and the other waveguide may have, for example, an n/p/p/n doping profile or a p/n/n/p doping profile. In yet another embodiment, the Mach-Zehnder device includes a center electrode arranged to provide an electrical potential to a node between the slot region of the waveguide and the other slot region of the other waveguide. In yet another embodiment, the electrodes further include a first electrode arranged to provide a reference potential to the waveguide and a second electrode arranged to provide the reference potential to the other waveguide such that a positive bias in the center electrode results in a positive phase shift in the waveguide and a negative phase shift in the other waveguide.

In yet another embodiment, the electrodes of the Mach-Zehnder device are arranged in a travelling wave configuration. For example, the electrodes may have a length of 0.5 cm or greater.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 10C is a diagram that shows a plot of modal patterns over four periods of a segmented waveguide on a horizontal plane that intersects the silicon layer halfway through.

DETAILED DESCRIPTION

Figure 1:
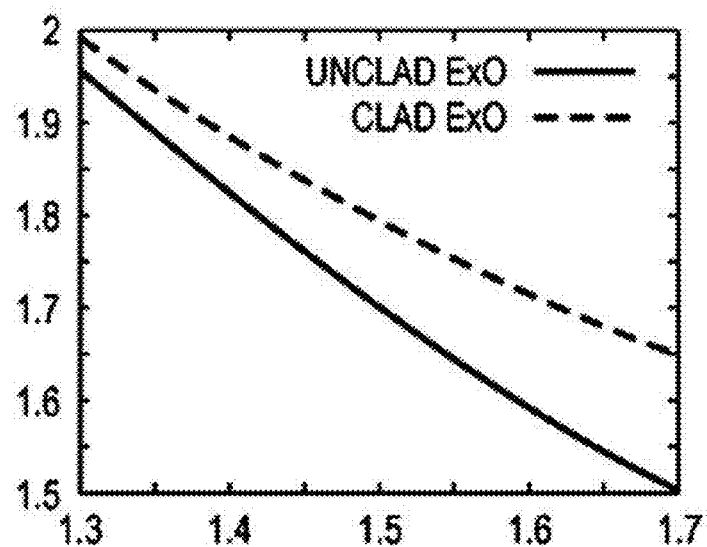
FIG. 1 is a diagram showing dispersion plots for the fundamental mode (Ex polarized) of exemplary clad and unclad waveguides, shown as effective index vs. wavelength in μm.

We describe hereinbelow an apparatus for providing electrooptic modulation. The apparatus may be based on a slot waveguide that is at least partially clad with a nonlinear optical polymer, which can, for example, be fabricated in a silicon-polymer integrated photonics technology. We have previously described such a suitable low drive voltage modulator device in detail in U.S. patent application Ser. No. 12/626,561, ALL OPTICAL MODULATION AND SWITCHING WITH PATTERNED OPTICALLY ABSORBING POLYMERS, and in U.S. patent application Ser. No. 12/630,833, PHASE MATCHING FOR DIFFERENCE FREQUENCY GENERATION AND NONLINEAR OPTICAL CONVERSION FOR PLANAR WAVEGUIDES VIA VERTICAL COUPLING, both of which applications are incorporated herein by reference in their entirety for all purposes. We begin with a brief technology overview followed by a description of exemplary slot waveguides and Mach Zehnder-based designs suitable for use in the inventive apparatus.

We now describe high index contrast waveguides that are useful to concentrate light in order to enhance nonlinear optical effects in various materials so that such effects can be employed to manipulate light (or more generally electromagnetic radiation) at low power levels, as compared to conventional systems and methods that employ nonlinear optical materials. The manipulation of electromagnetic radiation or light can be useful to provide a variety of components that perform operations on light such as rectification, modulation, filtering, and logic operations in a manner analogous to the same operations which are provided using electronic devices operating on electrical signals. For example, an input light wave to be processed is impressed onto the component. The light wave has at least one parameter characterizing the light wave, such as one of an intensity, a polarization, a frequency, a wavelength, and a duration (e.g., a pulse length, or in the case of continuous wave light, an effectively infinite duration). After the input light wave is processed (or interacts with the waveguide and the clad nonlinear optical material adjacent to the waveguide when present), an output signal is observed. In a circumstance where the input signal has been processed, the output signal has at least one parameter that is different from at least one parameter characterizing the input light wave, including possibly an electrical output signal when the input light wave had no electrical signal component (e.g., optical rectification).

We have developed a set of tools for concentrating light to a high degree by using silicon or other high index contrast waveguides, and we have fabricated devices that demonstrate some of the many applications that can be contemplated when such nonlinear materials are exploited. In particular, by utilizing split waveguides, we are able to greatly enhance the optical fields in the cladding of a tightly confined waveguide, without greatly enhancing the optical losses of the same waveguide. Combining the high field concentrations available from the split waveguides with the high nonlinear activity of nonlinear optical polymers permits the development of nonlinear optical devices operating at much lower optical input power levels than are possible with conventional free space or chip based systems. We have demonstrated four-wave mixing (which is based upon $\chi^3$), as well as optical rectification (based on $\chi^2$), in such waveguides. Using these waveguides it is possible to decrease the power levels needed to observe significant nonlinearities to the point where, by contrast with conventional nonlinear optics, it can be done with non-pulsed, continuous wave lasers.

Chi2 ($\chi^2$) and Chi3 ($\chi^3$) based optical effects can be used in particular to build on-chip optical parametric oscillator ("OPO") systems, where two input wavelengths can be mixed together to produce sum and difference frequencies. These frequencies can be either higher or lower than the input frequencies, and can be made tunable. These effects work for frequencies from the ultraviolet and X-ray regime all the way out into the far infrared and microwave, and in fact can work down to DC in some cases, particularly with optical rectification.

The material of which the high index waveguide is made can be any material having a high index that is reasonably transparent at the wavelengths of interest. This can include but is not limited to silicon, gallium nitride, indium phosphide, indium gallium nitride, gallium phosphide, diamond, sapphire, or the various quaternary III/V and II/VI materials such as aluminum gallium arsenide phosphide. III/V denotes materials having at least one element from column III of the periodic table of elements (or an element that is stable as a positive trivalent ion) and at least one element from column V (or an element that is stable as a negative trivalent ion). Examples of III/V compounds include BN, AlP, GaAs and InP. II/VI denotes materials having at least one element from column II of the periodic table of elements (or an element that is stable as a positive divalent ion) and at least one element from column VI (or an element that is stable as a negative divalent ion). Examples of II/VI compounds include MgO, CdS, ZnSe and HgTe.

We present successively the mechanical structure of exemplary embodiments of high index waveguides, exemplary embodiments of cladding materials having large nonlinear constants $\chi^2$ and $\chi^3$ and their incorporation into devices having high index waveguides, and some exemplary results observed on some of the fabricated devices that are described.

Exemplary High Index Waveguide Structures

High-Q Ring Resonators in Thin Silicon-on-Insulator

Resonators comprising high-Q microrings were fabricated from thin silicon-on-insulator (SOI) layers. Measured Q values of 45,000 were observed in these rings, which were then improved to 57,000 by adding a PMMA cladding. Various waveguide designs were calculated, and the waveguide losses were analyzed.

Microring resonator structures as laser sources and as optical filter elements for dense wavelength division multiplexing systems have been studied in the past. The silicon-on-insulator (SOI) structure described here is particularly advantageous. It has low waveguide loss. One can extrapolate an uncoupled Q value of 94,000 and a waveguide loss of 7.1 dB/cm in the unclad case, and −6.6 dB/cm in the PMMA clad case, from the respective measured Q values of 45,000 and 57,000. Although higher Q values have been obtained for optical microcavities, we believe that our geometry has the highest Q for a resonator based on a single mode silicon waveguide. It is also noteworthy that a large amount of power appears outside the core silicon waveguide, which may be important in some applications. The modes that are described herein have approximately 57% of the power outside the waveguide, as compared to 20% for a single-mode 200-nm-thick silicon waveguide, and 10% for a single-mode 300-nm-thick silicon waveguide.

In one embodiment, wafer geometries were selected that minimize the thickness of the SOI waveguiding layer as well as the buried oxide, but still yield low loss waveguides and bends. A number of different waveguide widths were compared by finite difference based mode solving. The geometry used in the exemplary embodiment comprises a 500-nm-wide waveguide formed in a 120-nm-thick silicon layer, atop a 1.4 μm oxide layer, which rests on a silicon handle, such as a silicon wafer as a substrate. Such a configuration supports only a single well-contained optical mode for near infrared wavelengths. The dispersion characteristics are shown in FIG. 1 for both unclad and PMMA-clad waveguides. Our interest in unclad structures stems from the ease of fabrication, as detailed in the following, as well as the flexibility an open air waveguide may provide for certain applications.

These modes were determined by using a finite difference based Hermitian eigensolver. It is possible to calculate the loss directly from the mode pattern with an analytic method valid in the low-loss limit. The waveguide loss at 1.55 μm calculated in such a fashion is approximately −4.5 dB. This loss figure was in agreement with the extrapolated results of FDTD simulation.

Because a loss of −4 dB/cm is attributed to substrate leakage, the waveguide loss can be improved by the addition of a cladding, which tends to pull the mode upwards. This notion is supported by the measured decrease in waveguide loss upon the addition of a PMMA cladding. It can be shown that the substrate leakage loss attenuation coefficient is nearly proportional to $$e^{-2\sqrt{n_{eff}^2-n_o^2}\,k_0 A}$$

if $k_0$ is the free space wave number, $n_{eff}$ is the effective index of the mode, $n_o$ is the effective index of the oxide layer, and A is the thickness of the oxide. In the present case, the e-folding depth of the above-mentioned function turns out to be 180 nm, which explains why the substrate leakage is so high.

SOI material with a top silicon layer of approximately 120 nm and 1.4 μm bottom oxide was obtained in the form of 200 mm wafers, which were manually cleaved, and dehydrated for 5 min at 180° C. The wafers were then cleaned with a spin/rinse process in acetone and isopropanol, and air dried. HSQ electron beam resist from Dow Corning Corporation was spin coated at 1000 rpm and baked for 4 min at 180° C. The coated samples were exposed with a Leica EBPG-5000+ electron beam writer at 100 kV. The devices were exposed at a dose of 4000 µc/cm², and the samples were developed in MIF-300 TMAH developer and rinsed with water and isopropanol. The patterned SOI devices were subsequently etched by using an Oxford Plasmalab 100 ICP-RIE within 12 mTorr of chlorine, with 800 W of ICP power and 50 W of forward power applied for 33 s. Microfabricated devices such as the one shown in FIG. 2 were tested by mounting the dies onto an optical stage system with a single-mode optical fiber array. A tunable laser was used first to align each device, and then swept in order to determine the frequency domain behavior of each of the devices. Light was coupled into the waveguides from a fiber mode by the use of grating couplers. Subsequently the devices were spin-coated with 11% 950 K PMMA in Anisole, at 2000 rpm, baked for 20 min at 180° C., and retested.

The theoretical development of the expected behavior of a ring resonator system has been described in the technical literature. In the present case the dispersion of the waveguide compels the addition of a dispersive term to the peak width. We take $\lambda_0$ to be the free space wavelength of a resonance frequency of the system, $n_0$ to be the index of refraction at this wavelength, $(\delta n/\delta \lambda)_0$, the derivative of n with respect to λ taken at $\lambda_0$, L to be the optical path length around the ring, α to be the optical amplitude attenuation factor due to loss in a single trip around the ring, and finally t to be the optical amplitude attenuation factor due to traveling past the coupling region. In the limit of a high Q, and thus $(1-\alpha) \ll 1$ and $(1-t) \ll 1$, we have $$Q = (\pi L/\lambda_0)[n_0 - \lambda_0 (\delta n/\delta \lambda)_0]/(1-\alpha t) \quad (1)$$

Figure 2:
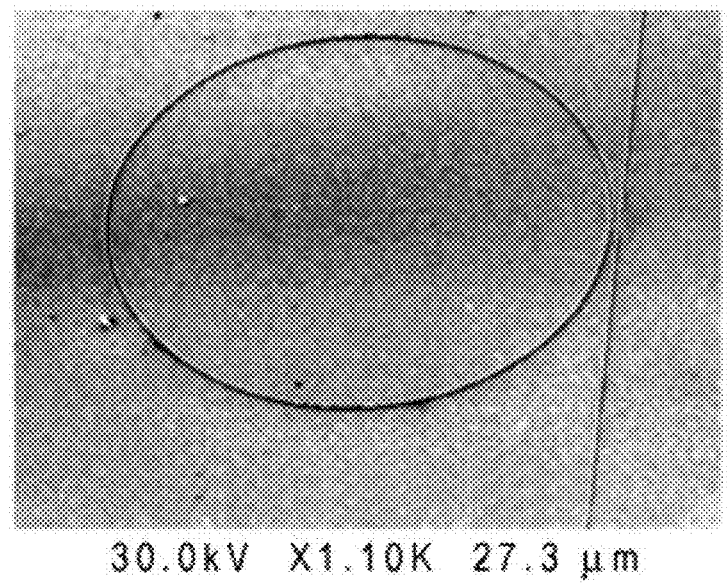
FIG. 2 is a diagram showing an SEM image of an exemplary ring resonator.
Figure 3:
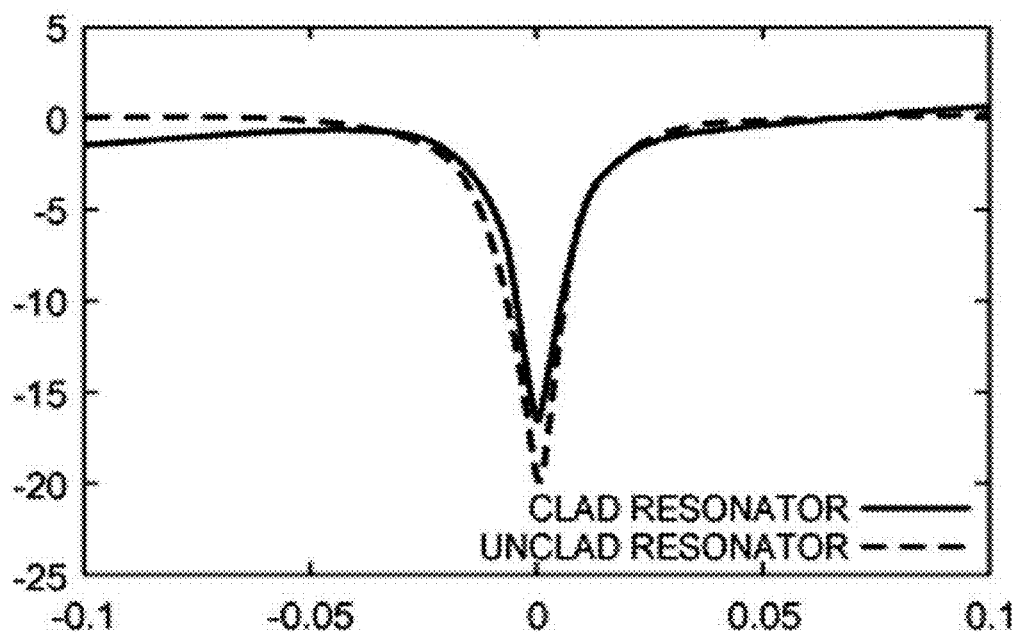
FIG. 3 is a diagram showing the normalized transmission of light through the system (and past the ring) in dB, as a function of wavelength detuning in nm for both clad and unclad waveguides, shifted to overlay resonance peaks.

The waveguide mode was coupled into a ring resonator from an adjacent waveguide. As shown in FIG. 2, the adjacent waveguide can in some embodiments be a linear waveguide. The strength of coupling can then be lithographically controlled by adjusting the distance between the waveguide and the ring. This ring was fabricated with a radius of 30 µm, a waveguide width of 500 nm, and a separation between ring and waveguide of 330 nm. For the clad ring presented, the measured Q is 45,000, and the extinction ratio is −22 dB, for the resonance peak at 1512.56 nm. The PMMA clad ring had a similar geometry, and achieved a Q of 57,000, but with an extinction ratio of −15.5 dB. Typical observed transmission spectra are shown in FIG. 3. The typical amount of optical power in the waveguide directly coupling into the resonator was about 0.03 mW. A dependence of the spectrum on this power was not observed, to within an order of magnitude.

From the mode-solving results for the unclad waveguides, we have $(\delta n/\delta \lambda)(1.512) = -1.182 \; \mu m^{-1}$, and $n(\lambda = 1.512) = 1.688$. Using this result and the earlier relations, the waveguide loss can be calculated from the measured Q value. Specifically, an extinction that is at least −22 dB indicates that a critically coupled Q in this geometry is greater than 38,500, which then implies a waveguide loss of less than −7.1 dB/cm. In similar fashion, the PMMA clad waveguide resonator with a Q of 57,000 but only −15.5 dB of extinction allows a worst case waveguide loss of −6.6 dB/cm. This also implies an intrinsic Q of 77,000 for the unclad resonator, and an intrinsic Q of 94,000 for the PMMA clad resonator.

These devices have a slight temperature dependence. Specifically, the resonance peak shifts correspondingly with the change in the refractive index of silicon with temperature, moving over 2 nm as temperature shifts from 18 to 65° C. The Q rises with higher temperatures slightly, from 33 k at 18° C. to 37 k on one device studied. This shift can probably be explained entirely by the dependence of Q on the effective index.

High-Q Optical Resonators in Silicon-On-Insulator Based Slot Waveguides

We now describe the design, fabrication and characterization of high Q oval resonators based on slot waveguide geometries in thin silicon on insulator material. Optical quality factors of up to 27,000 were measured in such filters, and we estimate losses of −10 dB/cm in the slotted waveguides on the basis of our resonator measurements. Such waveguides enable the concentration of light to very high optical fields within nano-scale dimensions, and show promise for the confinement of light in low-index material with potential applications for optical modulation, nonlinear optics and optical sensing. As will be appreciated, the precise geometry of a resonator (or other kinds of devices) is frequently a matter of design, and the geometry can be varied based on such considerations as length of waveguide, area of a chip, and required interaction (or required non-interaction), such as coupling (or avoiding coupling) with other waveguide structures that are present in a device or on a chip. In some embodiments, the waveguide can be a closed loop, such as at least one ring or at least one oval shaped endless stripe. As has been explained, optical energy can be provided to such a closed loop, for example with an input waveguide.

One can form high quality factor ring or oval resonators in SOI. In these SOI waveguides, vertical confinement of light is obtained from the index contrast between the silicon core and the low index cladding (or air) and the buried silicon dioxide layer, whereas lateral confinement can be obtained by lithographically patterning the silicon. The majority of the light tends to be guided within the silicon core in such waveguide. Although the high refractive index contrast between silicon and its oxide provide excellent optical confinement, guiding within the silicon core can be problematic for some applications. In particular, at very high optical intensities, two-photon absorption in the silicon may lead to high optical losses. Moreover, it is often desirable to maximize the field intensity overlap between the optical waveguide mode and a lower index cladding material when that cladding is optically active and provides electro-optic modulation or chemical sensing.

One solution to these problems involves using a slot waveguide geometry. In a slot waveguide, two silicon stripes are formed by etching an SOI slab, and are separated by a small distance. In one embodiment, the separation is approximately 60 nm. The optical mode in such a structure tends to propagate mainly within the center of the waveguide. In the case of primarily horizontal polarization, the discontinuity condition at the cladding-silicon interface leads to a large concentration of the optical field in the slot or trench between the two stripes. One can predict that the electric field intensity would be approximately $10^8 \sqrt{P}$ V/m where P is the input power in watts. One design uses a 120 nm silicon on insulator layer and 300 nm wide silicon strips on top of a 1.4 µm thick buried oxide layer, which is in turn deposited on a silicon substrate. Various widths for the central slot were fabricated to provide test devices with 50, 60 and 70 nm gaps. Slots larger than 70 nm have also been fabricated and were shown to work well.

In the 1.4-1.6 µm wavelength regime, the waveguide geometry is single mode, and a well-contained optical mode is supported between the two silicon waveguide slabs. There is some loss that such an optical mode will experience even in the absence of any scattering loss or material absorption due to leakage of light into the silicon substrate. The substrate loss can be estimated semi-analytically via perturbation theory, and ranges from approximately −0.15 dB/cm at 1.49 μm to about −0.6 dB/cm at 1.55 μm for the SOI wafer geometry of the present embodiment.

Figure 4:
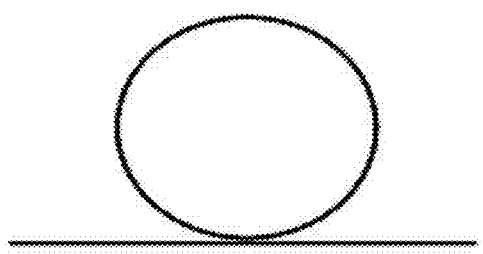
FIG. 4 is a diagram showing the device layout of an exemplary slot waveguide.

Oval resonators were fabricated by patterning the slot waveguides into an oval shape. An oval resonator geometry was selected in preference to the more conventional circular shape to enable a longer coupling distance between the oval and the external coupling waveguide or input waveguide. See FIG. 4. Slots were introduced into both the oval and external coupling waveguides.

Predicting coupling strength and waveguide losses for such devices is not easy. Many different coupling lengths and ring to input waveguide separations were fabricated and tested. It is well known that the most distinct resonance behavior would be observed for critically coupled resonators, in which the coupling strength roughly matches the round trip loss in the ring.

An analytic expression for the quality factor of a ring resonator was presented in equation (1) hereinabove.

Also, the free spectral range can be calculated via:

$$\Delta\lambda = (\lambda_0/L)/[1/L + n_0/\lambda_0 - (\delta n/\delta\lambda)_0] \qquad (2)$$

Here, L is the round trip length in the ring, and $n_0$ and $\lambda_0$ are the index of refraction, and the wavelength at resonance, respectively. The derivative of the effective index with respect to the wavelength at the resonance peak is given by $(\delta n/\delta\lambda)_0$, and it can be shown that this term is roughly equal to −0.6 μm$^{-1}$ from the 1.4-1.6 μm spectral range for the slot waveguides studied here.

Figure 5:
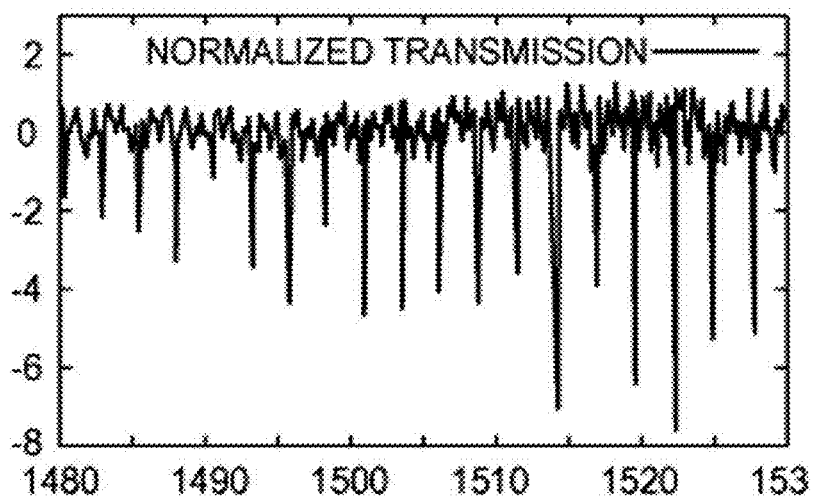
FIG. 5 is a diagram showing the measured transmission spectrum in dB vs. laser wavelength in nm past a high quality factor slot ring resonator.
Figure 6:
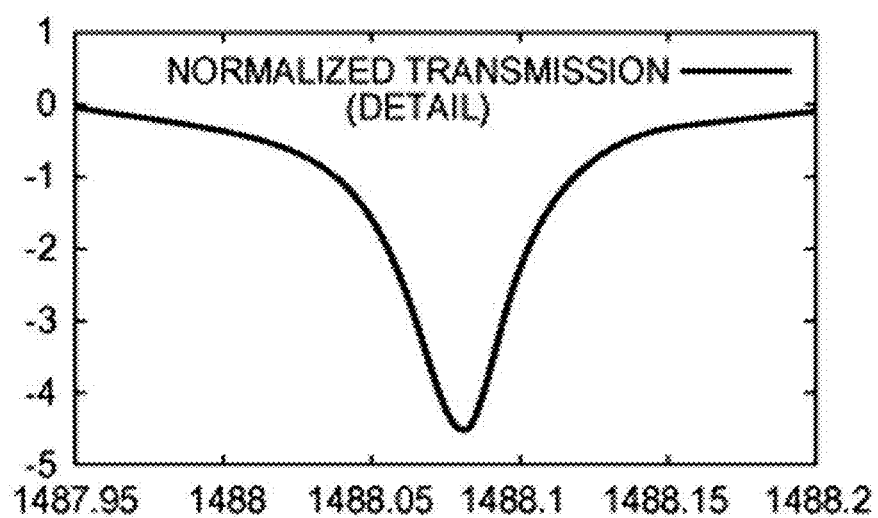
FIG. 6 is a diagram showing the detail of the peak of the transmission spectrum near 1488 nm.

We have observed a quality factor of 27,000 in a device fabricated with a slot size of 70 nm, a ring to input waveguide edge to edge separation of 650 nm, and a coupling distance of 1.6 μm. The radius of the circular part of the slotted oval was 50 μm. This resonance was observed near 1488 nm, and the resonance peak had an extinction ratio of 4.5 dB. FIG. 5 shows the measured transmission spectrum past the ring, normalized for the input coupler baseline efficiency of our test system. FIG. 6 shows the details of one peak in the vicinity of 1488 nm. Because the extinction ratio at the resonance peak was not very large in this case, it was not possible to accurately determine waveguide losses from this device. By measuring many devices with different geometries, we obtained data on resonators with higher extinction ratios that approached critical coupling. One such device was a 50 μm radius slotted ring resonator with a 60 μm waveguide gap, a ring to input waveguide spacing of 550 nm and coupling length of 1.6 μm. In this device, a Q of 23,400 was observed near 1523 μm, with an on-resonance extinction of 14.7 dB.

Since this resonance is nearly critically coupled, the waveguide loss can be estimated using equation (1) as −10 dB/cm. We can also use equation (2) to further validate our theoretical picture of the ring resonator. The observed free spectral range of this resonator was 2.74 nm, while equation (2) predicts 2.9 nm. This discrepancy is most likely due to small differences in the fabricated dimensions as compared to those for which the numerical solutions were obtained.

To further validate the waveguide loss result, several waveguide loss calibration loops were fabricated with varying lengths of the slot waveguide, ranging from 200 to 8200 um in length. A total of five center slot waveguide devices were studied for each of the 50, 60 and 70 nm slot widths. Linear regression analysis on the peak transmission of each series yielded waveguide loss figures of 11.6±3.5 dB/cm for the 50 nm center waveguide, 7.7±2.3 dB/cm for the 60 nm center waveguide, and 8.1±1.1 dB/cm for the 70 nm center waveguide. These figures are in agreement with the loss estimated from the oval resonator. Since the theoretical loss due to substrate leakage is much lower than this, it is clear that a great deal of loss is due to surface roughness and possibly material absorption. It is believed that engineering improvements will decrease this loss further. For sensing and modulation applications as well as use in nonlinear optics, the high optical field concentration that can be supported in the cladding material of the slotted waveguide geometry should be very advantageous when compared to more conventional waveguides.

Figure 7:
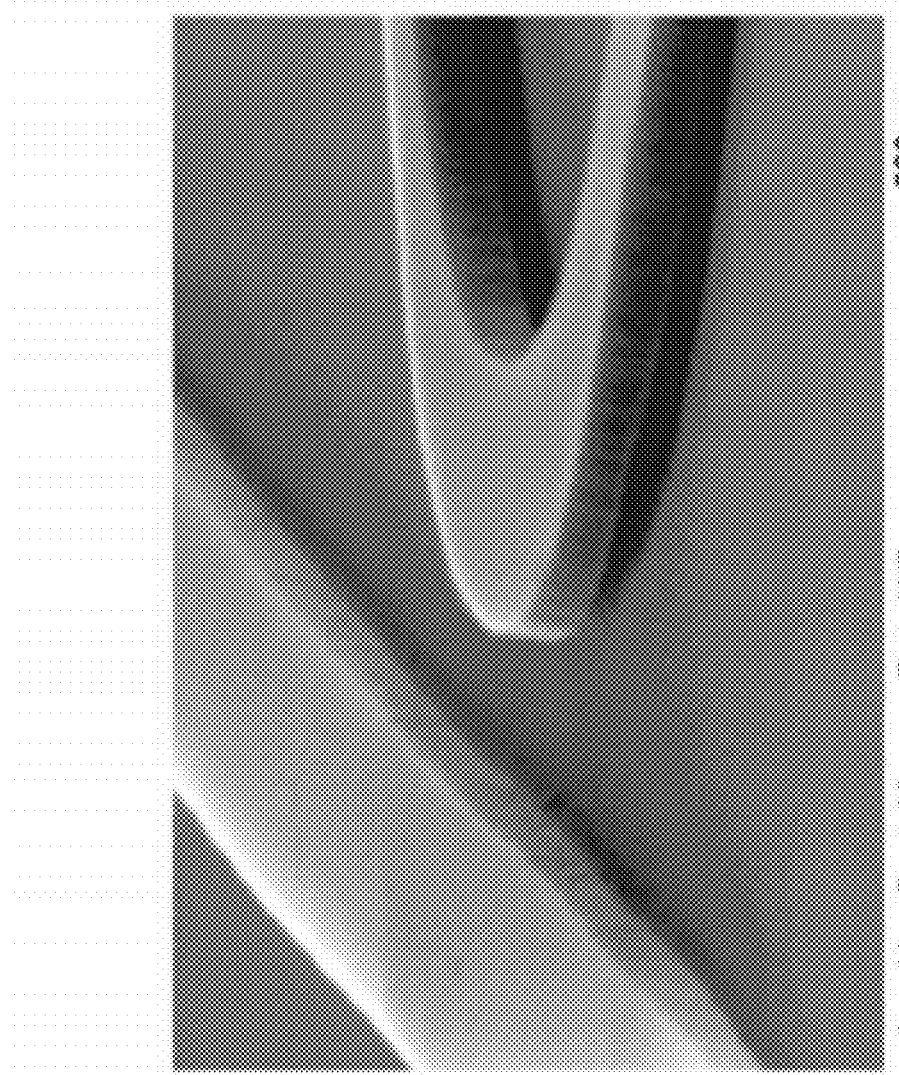
FIG. 7 is a diagram showing a shallow angle SEM view of a typical silicon-on-insulator ring resonator and waveguide having a sidewall roughness on the order of 10 nm.
Figure 8:
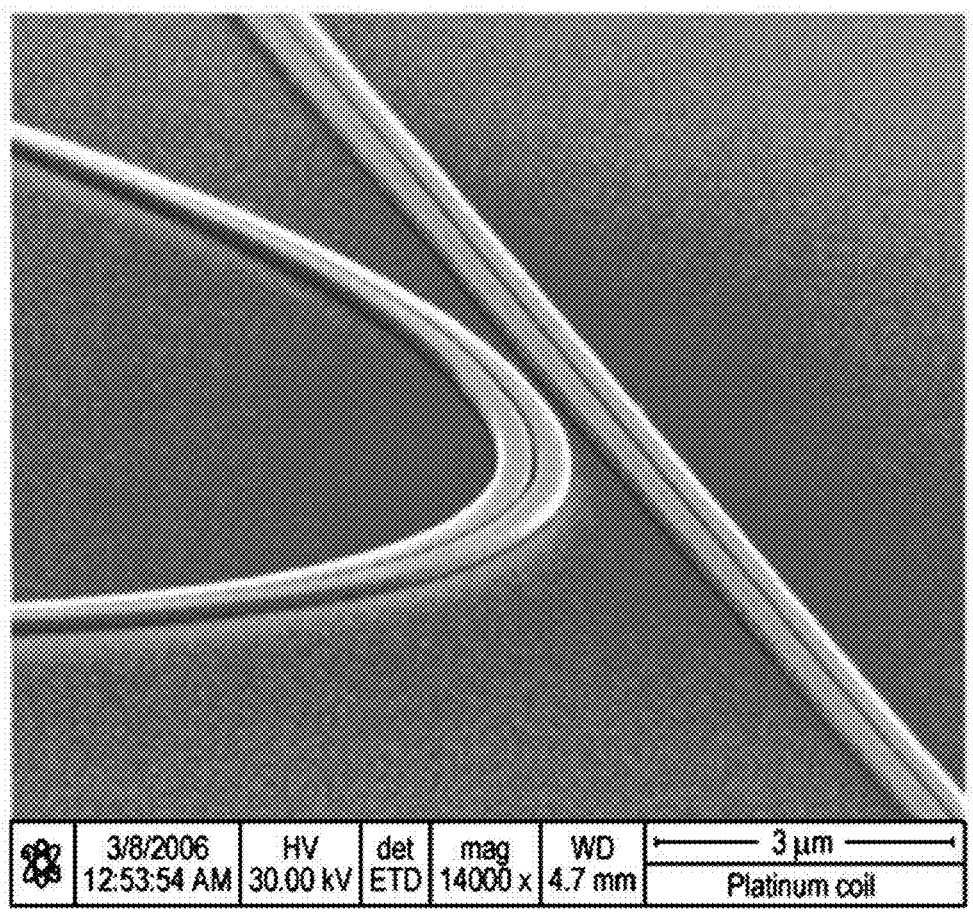
FIG. 8 is a diagram of a slot ring resonator directional coupler region, and the associated input waveguide.

FIG. 7 is a diagram showing a shallow angle SEM view of a silicon-on-insulator ring resonator and waveguide having a sidewall roughness on the order of 10 nm. In the exemplary waveguide shown in FIG. 7, the silicon-insulator bond has been decorated with a brief buffered oxide etch. FIG. 8 is a diagram of a slot ring resonator directional coupler region, and the associated input waveguide.

Figure 9:
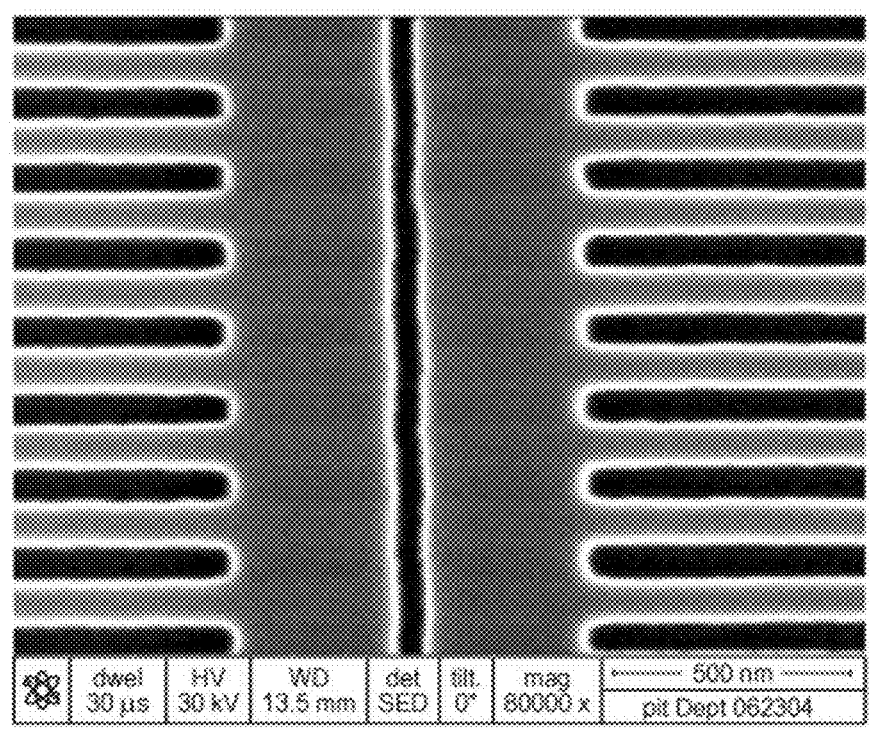
FIG. 9 is a diagram showing an exemplary high-index segmented waveguide structures, which in the embodiment shown comprises a central waveguide portion with fingers or ridges sticking out to the sides.

Other variations on the geometry of waveguides are possible. FIG. 9 is a diagram showing an exemplary high-index segmented waveguide structures, which in the embodiment shown comprises a central waveguide portion with fingers or ridges sticking out to the sides. With the light localized in the center in a Bloch mode, electrical contact can be established using the fingers or ridges that stick off the sides of the waveguide. This structure provides a way to form both electrical contacts to waveguides and structures that would provide electrical isolation with low optical loss. Through an iterative process involving a combination of optical design using a Hermetian Bloch mode eigensolver and fabrication of actual structures, it was found that (non-slotted) segmented waveguide structures could be constructed in 120 nm thick SOI. Waveguide losses as small as −16 dB per centimeter were observed, and insertion losses as small as −0.16 dB were shown from standard silicon waveguides.

Figure 10A:
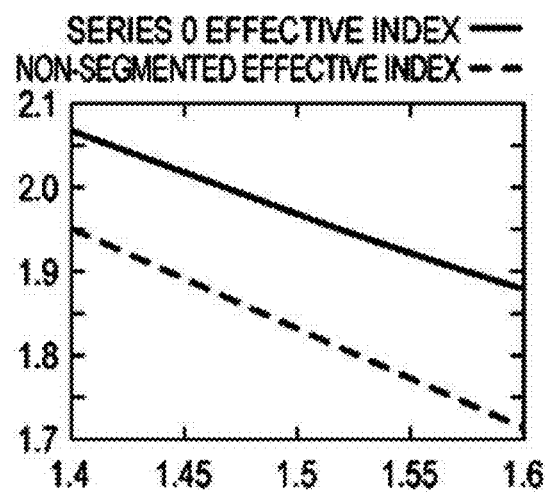
FIG. 10A is a diagram that shows a dispersion diagram of both a segmented waveguide and the normal, unsegmented waveguide, taken on a plane parallel to the substrate that on a z plane intersects the middle of a segment.
Figure 10B:
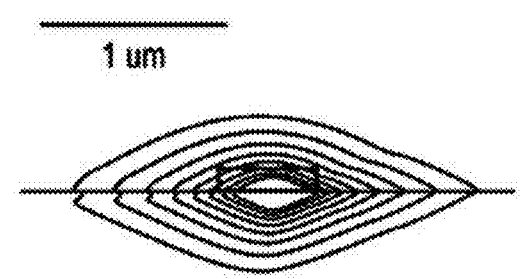
FIG. 10B is a diagram that shows modal patterns of the Bloch mode, with contours of |E| plotted, starting at 10% of the max value and with contour increments of 10%.
Figure 10C:
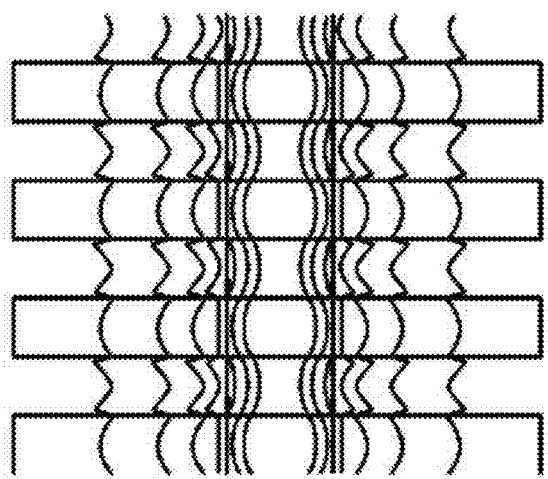

The segmented waveguide structure can also be modeled as regards its expected properties, which can then be compared to actual results. FIG. 10A is a diagram that shows a dispersion diagram of both a segmented waveguide and the normal, unsegmented waveguide, taken on a plane parallel to the substrate that on a z plane that intersects the middle of a segment. FIG. 10B is a diagram that shows modal patterns of the Bloch mode, with contours of |E| plotted, starting at 10% of the max value and with contour increments of 10%. FIG. 10C is a diagram that shows a plot of modal patterns over four periods of a segmented waveguide on a horizontal plane that intersects the silicon layer halfway through.

Figure 11:
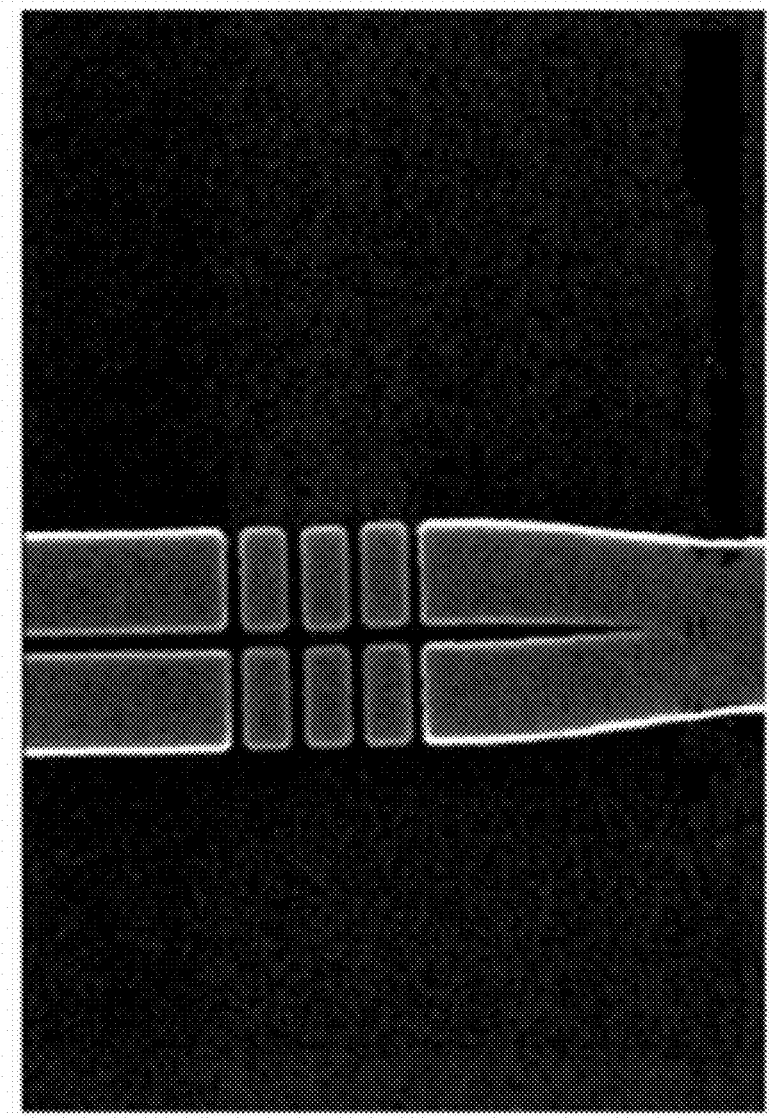
FIG. 11 is a diagram that shows an exemplary electrical isolator that was constructed and tested, and which provided both a transition from a standard to a slotted waveguide and electrical isolation between the two sides of the slot waveguide.

By utilizing the same type of design methodology as was used for the segmented waveguides, one is able to able to construct structures that provide electrical isolation without substantial optical loss. FIG. 11 is a diagram that shows an exemplary electrical isolator that was constructed and tested, and which provided both a transition from a standard to a slotted waveguide and electrical isolation between the two sides of the slot waveguide. Such structures were shown to have losses on the order of 0.5 dB.

Optical Modulation and Detection in Slotted Silicon Waveguides

In this example, we describe a system and process that provide low power optical detection and modulation in a slotted waveguide geometry filled with nonlinear electro-optic polymers and present examples that demonstrate such methods. The nanoscale confinement of the optical mode, combined with its close proximity to electrical contacts, enables the direct conversion of optical energy to electrical energy, without external bias, via optical rectification, and also enhances electro-optic modulation. We demonstrate this process for power levels in the sub-milliwatt regime, as compared to the kilowatt regime in which optical nonlinear effects are typically observed at short length scales. The results presented show that a new class of detectors based on nonlinear optics can be fabricated and operated.

Waveguide-based integrated optics in silicon provide systems and methods for concentrating and guiding light at the nanoscale. The high index contrast between silicon and common cladding materials enables extremely compact waveguides with very high mode field concentrations, and allows the use of established CMOS fabrication techniques to define photonic integrated circuits. By using slotted waveguides, it is possible to further concentrate a large fraction of the guided mode into a gap within the center of a silicon waveguide. This geometry greatly magnifies the electric field associated with the optical mode, resulting in electric fields of at least (or in excess of) $10^6$ V/m for continuous-wave, sub-milliwatt optical signals. Moreover, since the slotted geometry comprises two silicon strips which can be electrically isolated, a convenient mechanism for electro-optic interaction is provided. Such waveguides can be fabricated with low loss. We have previously described systems that provide losses below −10 dB/cm.

In the present example, we exploit both the high intensity of the optical field and the close proximity of the electrodes for several purposes. First, we demonstrate detection of optical signals via direct conversion to electrical energy by means of nonlinear optical rectification. An exemplary device comprises a ring resonator with an electro-optic polymer based $\chi^2$ material deposited as a cladding. Inside the slot, the high optical field intensity creates a standing DC field, which creates a virtual voltage source between the two silicon electrodes, resulting in a measurable current flow, in the absence of any external electrical bias. Though optical rectification has been observed in electro-optic polymers, typically instantaneous optical powers on the order of 1 kW are needed for observable conversion efficiencies, often achieved with pulsed lasers. The exemplary embodiment provides measurable conversion with less than 1 mW of non-pulsed input, obtained from a standard, low power tunable laser operating near 1500 nm.

In one embodiment, systems and methods of the invention provide standard Pockels' effect based modulation, which is similarly enhanced by means of the very small scale of our device. The close proximity of the electrodes, and ready overlap with the optical mode, causes an external voltage to produce a far larger effective electric modulation field, and therefore refractive index shift, than would be obtained through conventional waveguide designs. In one embodiment, the modulation and refractive index shift is provided by tuning the resonance frequencies of a slot waveguide ring resonator.

Device Fabrication
Waveguide Fabrication

The devices described in this example were fabricated in electronic grade silicon-on-insulator (SOI) with a top layer thickness of 110 nm and an oxide thickness of 1.3 microns. The silicon layer is subsequently doped to approximately $10^{19}$ Phosphorous atoms/cm$^3$, yielding resistivities after dopant activation of about 0.025 ohm-cm. Electro-optic ("EO") polymers were then spin-deposited onto the waveguide structures and subsequently poled by using a high field applied across the slot in the waveguide.

Lithography was performed using a Leica EBPG 5000+ electron beam system at 100 kv. Prior to lithography, the samples were manually cleaved, cleaned in acetone and isopropanol, baked for 20 minutes at 180 C, coated with 2 percent HSQ resist from Dow Corning Corporation, spun for two minutes at 1000 rpm, and baked for an additional 20 minutes. The samples were exposed at 5 nm step size, at 3500 μC/cm$^2$. The samples were developed in AZ 300 TMAH developer for 3 minutes, and etched on an Oxford Instruments PLC Plasmalab 100 with chlorine at 80 sccm, forward power at 50 W, ICP power at 800 W, 12 mTorr pressure, and 33 seconds of etch time. The samples were then implanted with phosphorous at normal incidence, 3 OkeV energy, and $1 \times 10^{14}$ ions/cm$^2$ density. The sample was annealed under a vacuum at 950 C in a Jipilec Jetstar rapid thermal annealer. The samples were dipped in buffered hydrofluoric acid in order to remove the remnants of electron beam resist from the surface.

After initial optical testing, the samples were coated with YLD 124 electro-optic polymer, and in one case with dendrimer-based electro-optic material. The samples were stored under a vacuum at all times when they were not being tested, in order to reduce the chances of any degradation.

Measurement Results
Optical Rectification Based Detection

Figure 12:
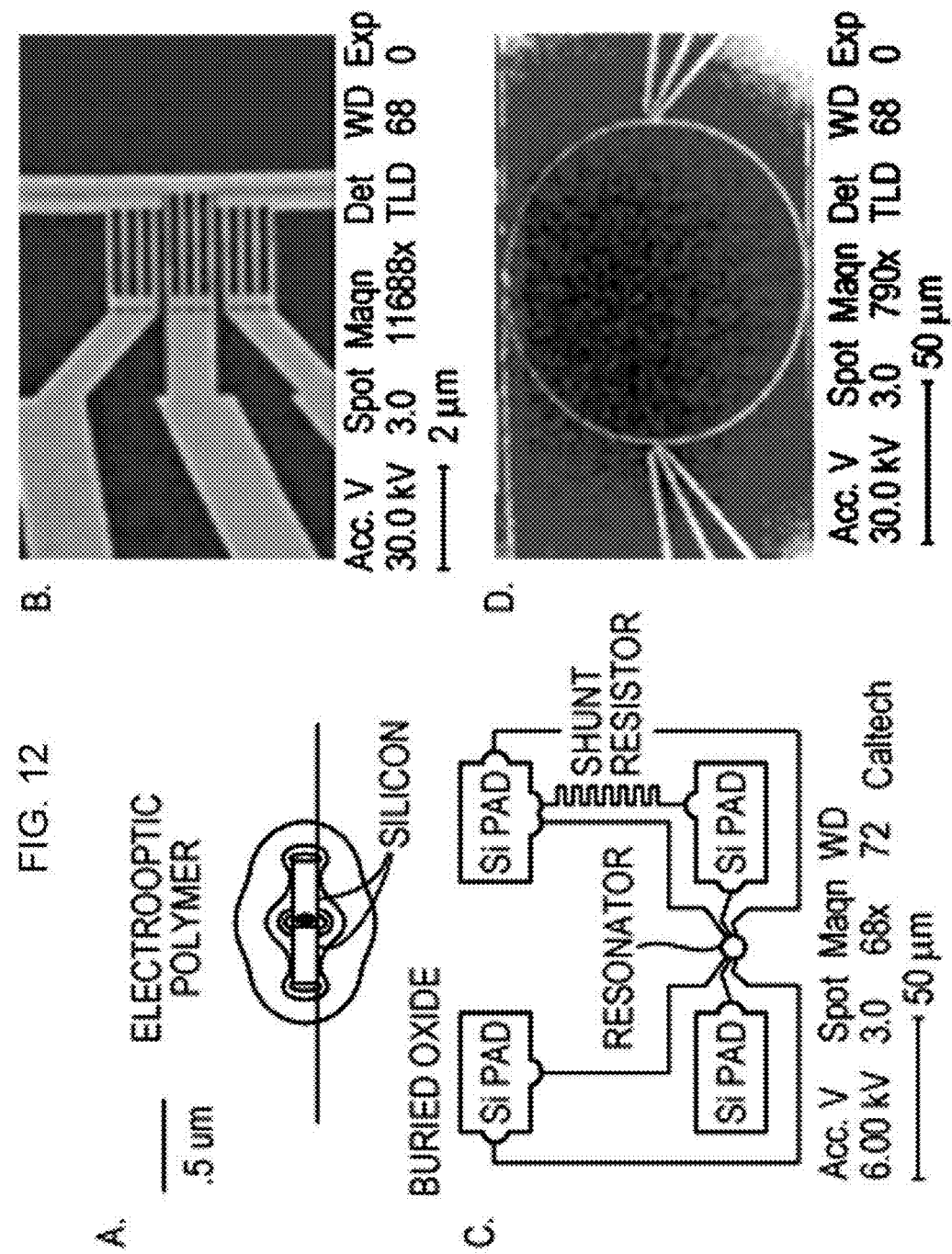
FIG. 12 is a four panel diagram that shows details of one embodiment of an optical modulator device, including the geometry of the photodetectors and filters, and including a cross section of the slotted waveguide.

FIG. 12 is a four panel diagram that shows details of one embodiment of an optical modulator device, including the geometry of the photodetectors and filters, and including a cross section of the slotted waveguide. Panel A of FIG. 12 shows a cross section of the device geometry with optical mode superimposed on a waveguide. In FIG. 12A, the optical mode was solved using a finite-difference based Hermetian Eigensolver, such as that described by A. Taflove, *Computational Electrodynamics*, (Artech House, Boston. Mass., 1995), and has an effective index of approximately 1.85 at 1500 nm. Most of the electric field is parallel to the plane of the chip, and it is possible to contact both sides of the slot in a slotted ring resonator, as shown in FIG. 12B, which shows a SEM image of the resonator electrical contacts. Electrically isolated contacts between the silicon rails defining the slotted waveguide introduce only about 0.1 dB of optical loss. FIG. 12C shows the logical layout of device, superimposed on a SEM image of a device. FIG. 12C details the layout of a complete slotted ring resonator, with two contact pads connected to the outer half of the ring, and two pads electrically connected to the inner half of the ring. A shunt resistor provides a means of confirming electrical contact, and typical pad-to-pad and pad-to-ring resistances range from 1MΩ to 5MΩ. FIG. 12D displays a typical electrically contacted slotted ring as presently described. FIG. 12D is an image of the ring and the electrical contact structures.

Measurements were performed with single-mode polarization maintaining input and output fibers, grating coupled to slotted waveguides with an insertion loss of approximately 8 dB. Optical signal was provided from an Agilent 81680A tunable laser and in some cases an erbium doped fiber amplifier ("EDFA") from Keopsys Corporation. A continuous optical signal inserted into a poled polymer ring results in a measurable current established between the two pads, which are electrically connected through a pico-Ammeter. In the most sensitive device, a DC current of ~1.3 nA was observed, indicating an electrical output power of ~$10^{-9}$ of the optical input power ($5 \times 10^{-12}$ W of output for approximately 0.5 mW coupled into the chip). Control devices, in which PMMA or un-poled EO material was substituted, show no photocurrent.

The fact that there is no external bias (or indeed any energy source) other than the optical signal applied to the system of this embodiment demonstrates conclusively that power is being converted from the optical signal. To establish that the conversion mechanism is actually optical rectification, we performed a number of additional measurements. A steady bias was applied to the chip for several minutes, as shown in Table 1A. A substantial change in the photoresponse of the device was observed. This change depends on the polarity of the bias voltage, consistent with the expected influence of repoling of the device in-place at room temperature. Specifically, if the external bias was applied opposing the original poling direction, conversion efficiency generally decreased, while an external bias in the direction of the original poling field increased conversion efficiency.

TABLE 1

Polling Results

Part A:

| Action | New Steady State Current (6 dBm input) |
|---|---|
| Initial State | −5.7 pA |
| +10 V for 2 minutes | 0 pA |
| −10 V for 2 minutes | −7.1 pA |
| +10 V for 2 minutes | −4.4 pA |
| +10 V for 4 minutes | −6.1 pA |
| −10 V for 4 minutes | −4.5 pA |
| −10 V for 2 minutes | −14.8 pA |

Part B:

| Device | Action | Current Polarity of Optical Rectification |
|---|---|---|
| 1 | Positive Poling | Positive |
| 1 | Thermal Cycling to poling temperature with no_voltage | Rapid fluctuation, did not settle |
| 1 | Negative Poling | Negative |
| 2 | Negative Poling | Negative |
| 2 | Thermal Cycling to Poling temperature with no voltage | None observable |
| 2 | Positive Poling | Negative |
| 3 | Negative Poling | Negative |
| 4 | Positive Poling | Positive |
| 5 | Negative Poling | Negative |

To further understand the photo-conversion mechanism, 5 EO detection devices were poled with both positive and negative polarities, thus reversing the direction of the relative $\chi^2$ tensors. For these materials, the direction of $\chi^2$ is known to align with the polling E field direction, and we have verified this through Pockels' effect measurements. In all but one case, we observe that the polarity of the generated potential is the same as that used in poling, and the +V terminal during poling acts as the −V terminal in spontaneous current generation, as shown in Table 1B. Furthermore, the polarity of the current is consistent with a virtual voltage source induced through optical rectification. It was observed that these devices decay significantly over the course of testing, and that in one case the polarity of the output current was even observed to spontaneously switch after extensive testing. However, the initial behavior of the devices after poling seems largely correlated to the $\chi^2$ direction.

Part A of Table 1 shows the dependence of the steady state observed current after room temperature biasing with various voltage polarities for one device. The device was originally polled with a ~12 V bias, though at 110 C. With one exception, applying a voltage in the direction of the original polling voltage enhances current conversion efficiencies, while applying a voltage against the direction of the polling voltage reduces the current conversion efficiencies. It should be noted that the power coupled on-chip in these measurements was less than 1 mW due to coupler loss.

Part B of Table 1 shows the behavior of several different devices immediately after thermal polling or cycling without voltage. Measurements were taken sequentially from top to bottom for a given device. The only anomaly is the third measurement on device 2; this was after significant testing, and the current observed was substantially less than was observed in previous tests on the same device. We suspect that the polymer was degraded by repeated testing in this case.

Analysis of Data for Optical Rectification

To derive the magnitude of the expected photocurrent, we assume that the $\chi^2$ magnitude relating to the Pockels' effect is similar to that for optical rectification. A measurement of $\chi^2$ can then be obtained from the direct observation of the electro-optic coefficient by the standard measurements described earlier. The typical measured tuning value of 2 GHz/V yields approximately 50 pm/V.

In the best case, devices with 6 dBm of input power returned approximately 1.4 nA of current. With Qs ranging from 3 k to 5 k, and assuming approximately 7 dB of insertion loss in the input grating coupler on one of our chips, in the best case as much as 0 dBm might be circulating in a resonator on resonance. This implies a peak electric field due to the optical signal of approximately $3.1 \times 10^6$ V/m. The induced static nonlinear polarization field is then nearly 1000 V/m, which amounts to a voltage drop of $14 \times 10^{-5}$ V across a 140 nm gap. If this voltage is assumed to be perfectly maintained, and the load resistance is assumed to be 5 MΩ, then 28 pA would be generated, about a factor of 100 less than is observed in the largest measurement made, but within a factor of 20 of the typical measurement of 352 pA for 6 dBm of input. Significantly, because the generated current is quadratic in E, it is clear that the current will be linearly proportional to the input intensity. This is in accordance with our observations. The best results for optical rectification were obtained with YLD 124/APC polymer, whereas our best Pockels' Effect results were obtained with the dendrimer materials.

Significantly, the sign of the output current matches that which would be predicted by nonlinear optical rectification, as discussed above. Specifically, since positive current emanates from the positive terminal, the rectified E field has a sign reversed from the $\chi^2$ and the polling E field. It is well established that the $\chi^2$ direction tends to align with the direction of the polling E field. Because of this, the rectified field acting as a voltage source will produce an effective positive terminal at the terminal that had the positive polling voltage.

We do not yet fully understand the current generation mechanism. In particular, it is not clear what provides the mechanism for charge transport across the gap. The APC material in which the nonlinear polymer is hosted is insulating, and though it does exhibit the photoconductivity effect due to visible light, it is unclear whether it can for near-infrared radiation. Photoconductivity due to second harmonic generation may play a role in this effect. It is certainly the case, however, that current flows through this gap; that is the only region in the entire system where an electromotive force exists. Also, photoconductivity alone is not adequate to explain the reversal of the current coming from the detector devices when the poling direction is reversed, nor the conversion of the optical input into directed current in general. The only mechanism to our knowledge that adequately explains this data is optical rectification.

If we assume that it will be possible to achieve a 10-fold improvement in the Q's of the resonators, while still getting more than 10 dB of extinction, then the intensity circulating in such a ring would be about 13 dB up from the intensity of the input wave. By comparison, with a Q of about 1000 and high extinction, the peak circulating intensity is about the same as the intensity in the input waveguide. Therefore, it is reasonable to expect that it will be possible to get at least 10 dB of improvement in the circulating intensity, and thus in the conversion efficiency, by fabricating higher Q rings.

By combining the nano-scale slotted waveguide geometry with electro-optical polymers having high nonlinear constants, we have obtained massive enhancement of the optical field. That has in turn enabled us to exploit nonlinear optical processes that are typically only available in the kW regime in the sub-mW regime. This difference is so considerable that we believe it represents a change in kind for the function of nonlinear optical devices. In addition, it is believed that this hybrid material system provides systems and methods for creating compact devices that exploit other nonlinear phenomena on-chip.

Optical rectification based detectors can have many advantages over currently available technology. In particular, such detectors are expected to function at a higher intrinsic rate than the typical photodiode in use, as the optical rectification process occurs at the optical frequency itself, on the order of 100 THz in WDM systems. The absence of an external bias, and the generation of a voltage rather than a change in current flow, both provide certain advantages in electronic operation. We also believe that a device based on nonlinear optical rectification will not suffer from the limitation of a dark current. This in turn can provide WDM systems that will function with lower optical power, providing numerous benefits. Similarly, our demonstration of enhanced modulation using these waveguide geometries provides useful components for future communications systems.

We believe that there will be advantageous economic aspects of such devices in various embodiments. Because our devices can be fabricated in planar electronics grade silicon-on-insulator, using processes compatible with advanced CMOS processing, it is expected that devices embodying these principles will be less expensive to fabricate.

Optical Modulators

Optical modulators are a fundamental component of optical data transmission systems. They are used to convert electrical voltage into amplitude modulation of an optical carrier frequency, and they can serve as the gateway from the electrical to the optical domain. High-bandwidth optical signals can be transmitted through optical fibers with low loss and low latency. All practical high-speed modulators that are in use today require input voltage shifts on the order of 1V to obtain full extinction. However it is extremely advantageous in terms of noise performance for modulators to operate at lower drive voltages. Many sensors and antennas generate only millivolts or less. As a result it is often necessary to include an amplifier in conventional optical transmission systems, which often limits system performance. By using silicon nano-slot waveguide designs and optical polymers, it is possible today to construct millivolt-scale, broadband modulators. In some embodiments, a millivolt-scale signal is one having a magnitude in the range of hundreds of millivolts down to units of millivolts. Using novel nanostructured waveguide designs, we have demonstrated a 100× improvement in Vπ over conventional electro-optic polymer modulators.

A variety of physical effects are available to produce optical modulation, including the acousto-optic effect, the Pockels effect either in hard materials, such as lithium niobate or in electro-optic polymers, free-carrier or plasma effects, electro-absorption, and thermal modulation. For many types of optical modulation, the basic design of a modulator is similar; a region of waveguide on one arm of a Mach-Zehnder interferometer is made to include an active optical material that changes index in response to an external signal. This might be, for instance, a waveguide of lithium niobate, or a semiconductor waveguide in silicon. In both cases, a voltage is introduced to the waveguide region by means of external electrodes. This causes the active region to shift in index slightly, causing a phase delay on the light traveling down one arm of the modulator. When the light in that arm is recombined with light that traveled down a reference arm, the phase difference between the two signals causes the combined signal to change in amplitude, with this change depending on the amount of phase delay induced on the phase modulation arm. Other schemes, where both arms are modulated in order to improve performance, are also common.

Figure 13:
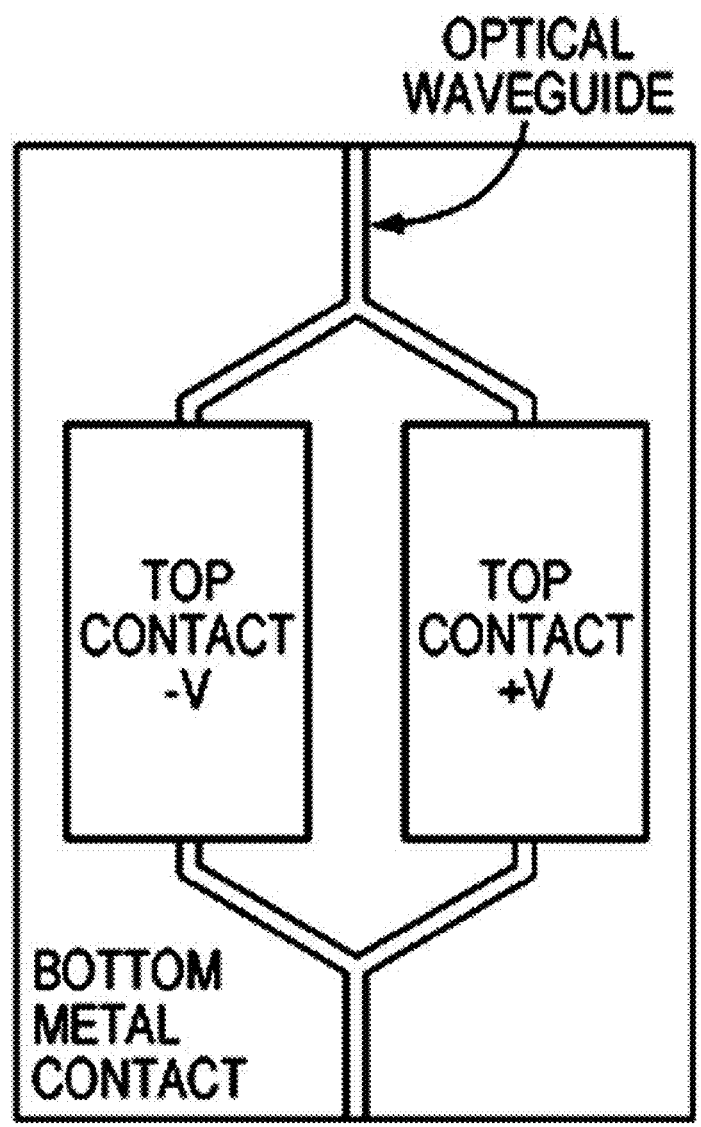
FIG. 13 shows a diagram of a Mach-Zehnder modulator with a conventional electrode geometry in top-down view, including top contact, waveguide, and bottom contact layers.

The measure of the strength of a modulation effect is how much phase shift is obtained for a given input voltage. Typical conventional modulators obtain effective index shifts on the order of 0.004% for 1 V. This implies that a Mach-Zehnder 1 cm in length, meant to modulate radiation near 1550 nm, would require 1 V of external input for the arms to accumulate a relative phase shift of π radians. The half wave voltage $V_\pi$ (or $V_{pi}$) is the voltage needed for an interarm phase shift of π radians (or 180 degrees). Lower values for $V_\pi$ imply that less power is needed to operate the modulator. Often, the responsivity, a length-independent product $V_\pi$-L is reported. Typical $V_\pi$-L values are in the range of 8 Vcm in silicon, or 6 V-cm for lithium niobate modulators. This voltage-length product, or responsivity, is an important figure of merit for examining a novel modulator design. Making a modulator physically longer generally trades lower halfwave voltage against reduced operating frequency and higher loss. Because generating high-speed and high-power signals requires specialized amplifiers, particularly if broadband performance is required, lowering the operating voltage of modulators is extremely desirable, particularly for on-chip integrated electronic/photonic applications, (including chip-to-chip interconnects) where on-chip voltages are limited to levels available in CMOS. FIG. 13 shows a diagram of a Mach-Zehnder modulator with a conventional electrode geometry.

FIG. 13 is a top-down view of a simple conventional Mach-Zehnder polymer interferometer, showing top contact, waveguide, and bottom contact layers. Such a device is usually operated in 'push/pull' mode, where either opposite voltages are applied to the different arms, or where the two arms are poled in opposite directions to achieve the same effect.

In the past several years, silicon has gained attention as an ideal optical material for integrated optics, in particular at telecommunications wavelengths. Low loss optical devices have been built, and modulation obtained through free carrier effects. One of the waveguides that can be supported by silicon is the so-called slot waveguide geometry. This involves two ridges of silicon placed close to each other, with a small gap between them. We have demonstrated modulation regions based on filling this gap with a nonlinear material, and using the two waveguide halves as electrodes. In such a geometry, the silicon is doped to a level that allows electrical conductivity without causing substantial optical losses. This allows the two wires or ridges to serve both as transparent electrical contacts and as an optical waveguide.

Using slot waveguides, we previously obtained an improvement in modulation strength of nearly 5× when compared to the best contemporary conventional waveguide geometries with electrodes separated from the waveguide, with the initial, non-optimized designs. This improvement was based on the remarkably small width of the gap across which the driving voltage drops. It is expected that smaller gaps translate into higher field per Volt, and the Pockels Effect depends on the local strength of the electric field. The smaller the gap, the larger the index shift. A unique property of slot waveguides is that, even as these gaps become nanoscale, the divergence conditions on the electric field require that much of the optical mode remains within the central gap. As a result, changing the index within a nanoscale gap can give a remarkably large change in the waveguide effective index. Because of these divergence conditions, the optical mode's effective index is largely determined by the shift found even in very small gaps.

Low $V_\pi$ Modulators

Several major approaches toward achieving low $V_\pi$ modulation have recently been pursued. The free-carrier dispersion effect in silicon waveguides has been used. Green et al. achieved a $V_\pi$ of 1.8 V with this effect. Modulators based on lithium niobate are also frequently used. Typical commercially obtained $V_\pi$ values are 4 V. Recently, Mathine and co-workers have demonstrated a nonlinear polymer based modulator with a $V_\pi$ of 0.65 V. For the devices produced by others, the attained values of $V_\pi$ are large.

A number of approaches have been proposed for developing low $V_\pi$ modulators. Different proposed approaches rely the development of new electrooptic materials, or on optical designs that trade bandwidth for sensitivity, either through the use of resonant enhancement, or through dispersion engineering. The designs presented herein are based upon conventional, high-bandwidth Mach-Zehnder traveling wave approaches, but achieve appreciable benefits from using nano-slot waveguides. Of course, these designs can also take advantage of the newest and best electrooptic polymers. In principle, any material that can be coated conformally onto the surface of the silicon waveguides and that is reasonably resistive could be used to provide modulation in these systems, making the system extremely general.

The most recent nonlinear polymers achieve a high nonlinear coefficient, expressed as an $r_{33}$ of 500 pm/V. Using this in combination with the high susceptibilities described above, it is believed that it is possible today to construct a 1 cm Mach-Zehnder modulator with a $V_\pi$ of 8 mV. This corresponds to a ring resonator with a tuning sensitivity of 795 GHz/V. Both of these values are two orders of magnitude better than the performance obtained by current approaches. Current commercially available modulators typically have $V\pi$'s from 1 to 9 V, and current tunable electro-optic polymer based resonators achieve 1 GHz/V of tunability. If the $r_{33}$ value of 33 pm/V demonstrated by Tazawa and Steier for conventional polymer designs is used, then a $V_\pi$ of 64 mV and a resonator tunability of 50 GHz/V are obtained.

Segmented waveguide contact structures can be formed that allow very low resistance electrical contact to slot waveguides. We have described above, in similar circumstances, electrical contact to waveguides can be established via segmented waveguides. See FIG. 12B and FIG. 12D and the discussion related thereto. When the RC circuits implied by the segmentation geometry and the gap are examined, it is found that RC turn on times on the order of 200 GHz or more are achievable. Because the nonlinear polymers exhibit an ultrafast nonlinearity, these waveguide geometries present a path to making Terahertz scale optical modulators. Because the modulation is so strong, it is also possible to trade the length of the modulator against $V_\pi$. For example, our optimal geometry is expected obtain a $V\pi$ of 0.6 V with a 100 µm long Mach-Zehnder modulator. This device is expected be exceptionally simple to design for 10 GHz operation, as it could likely be treated as a lumped element. We have shown above that lateral contact structures with low loss and low resistance can be constructed with these slot waveguides. See FIG. 12B and FIG. 12D and the discussion related thereto.

We believe these nano-slot waveguide designs present a path to realizing very high speed, low voltage modulators. It is advantageous to be able to attain a responsivity $V_\pi$-L of less than 1 V-cm. The physical principles involved in such devices are based on employing a nonlinear material of at least moderate resistivity, and a high index contrast waveguide with tight lithographic tolerances. Therefore, it is expected that nano-slot waveguides, either as Mach-Zehnder or ring-based devices, are likely an advantageous geometry for optical modulation with nonlinear materials in many situations. In addition, materials compatibility and processing issues are greatly reduced for such devices compared to conventional multilayer patterned polymer modulator structures.

These high index contrast devices have (or are expected to have) extremely small bend radii, which are often orders of magnitude smaller than corresponding all-polymer designs with low loss and high Q. These geometric features translate into extremely high free spectral ranges for ring modulators, compact devices, and wide process latitudes for their fabrication. Given the inexpensive and readily available foundry SOI and silicon processes available today, and the commercial availability of electron beam lithography at sub-10 nm line resolution, it is expected that slot-waveguide based modulators are likely to replace conventional modulators in many applications in the coming years.

Waveguide Geometries

Figure 14:
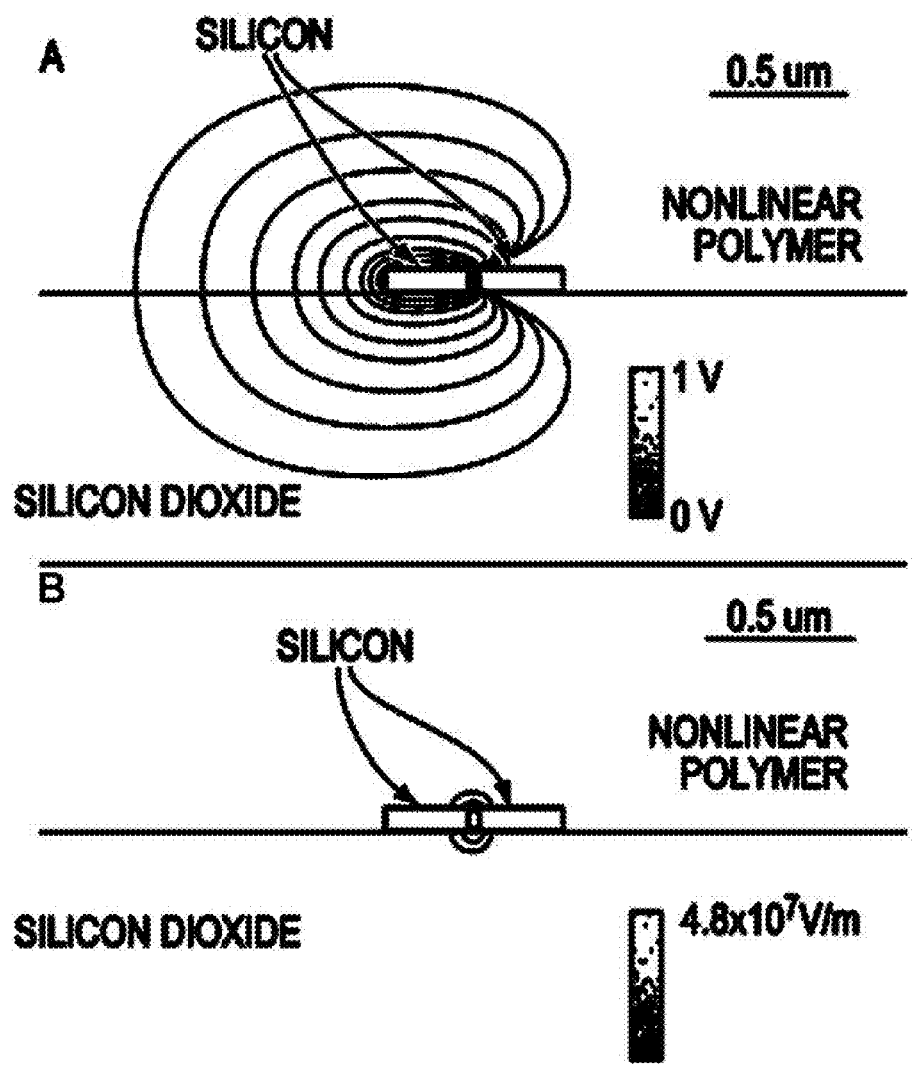
FIG. 14A shows the static voltage potential field distribution due to charging the two electrodes.
FIG. 14B shows the electric field due to the potential distribution. |E| is plotted in increments of 10%.

We now describe several different waveguide geometries, and show the effective index susceptibility as a function of the slot sizes of the waveguide. The susceptibilities are calculated near a 1550 nm free space wavelength. However, the values obtained will not vary much from 1480 nm to 1600 nm as the modal pattern does not change significantly. In the embodiments described, the waveguides are composed of silicon, and assumed to rest on a layer of silicon dioxide. The top cladding is a nonlinear polymer with an index of 1.7. This is similar to the waveguide geometry that we have used in our modulation work described hereinabove. FIG. 14 shows the static electric fields solved as part of analyzing waveguide design 1 with a gap of 40 nm, as described in Table 2. As one would expect, the field is nearly entirely concentrated inside the slot area. The field shown was calculated assuming a voltage difference of 1 Volt. It is slightly larger than simply the reciprocal of the gap size due to the singular nature of the solution to Poisson's equation near the corners of the waveguide.

FIG. 14A and FIG. 14B illustrate solved field patterns for the analysis of waveguide 1 at a 40 nm gap. FIG. 14A shows the static voltage potential field distribution due to charging the two electrodes. FIG. 14B shows the electric field due to the potential distribution. |E| is plotted in increments of 10%.

We have constrained ourselves to use waveguide geometries that have minimum feature sizes of at least 20 nm. These are near the minimum feature sizes that can be reliably fabricated using e-beam lithography. Table 2 lists a description of each type of waveguide studied. Each waveguide was studied for a number of different gap sizes. In all cases, the maximum susceptibility was obtained at the minimum gap size. The maximum gap size studied and the susceptibility at this point are also listed. In some cases, the study was terminated because at larger gap sizes, the mode is not supported; this is noted in Table 2. For multislot waveguide designs where there are N arms, there are N−1 gaps; the design presumes that alternating arms will be biased either at the input potential or ground.

Table 2 shows the effective index susceptibility for various waveguide designs. The susceptibility is approximately inversely proportional to gap size.

It is clear that within the regime of slotted waveguides, it is always advantageous to make the slot size smaller, at least down to the 20 nm gap we have studied. This causes the DC electric field to increase, while the optical mode tends to migrate into the slot region, preventing any falloff due to the optical mode failing to overlap the modulation region.

TABLE 2

| Waveguide Design | Waveguide Height (nm) | Arm Sizes (nm) | Maximum γ (μm$^{-1}$) | Minimum γ (μm$^{-1}$) |
|---|---|---|---|---|
| 1 | 100 | 300, 300 | 1.3, 20 nm gap | .40, 140 nm gap |
| 2 | 150 | 300, 300 | 1.6, 20 nm gap | .68, 120 nm gap |
| 3 | 200 | 300, 300 | 2.3, 20 nm gap | .74, 120 nm gap |
| 4 | 100 | 400, 400 | 1.1, 20 nm gap | .67, 60 nm gap, modal limit |
| 5 | 100 | 250, 250 | 1.2, 20 nm gap | .56, 60 nm gap, modal limit |
| 6 | 100 | 300, 40, 300 | 1.6, 20 nm gap | .53, 80 nm gap, modal limit |
| 7 | 100 | 300, 40, 40, 300 | 1.9, 20 nm gap | .76, 60 nm gap, modal limit |
| 8 | 200 | 200, 40, 200 | 3, 20 nm gap | 1.4, 60 nm gap, modal limit |
| 9 | 300 | 300, 300 | 2.5, 20 nm gap | 2.5, 20 nm gap, modal limit |
| Steier et al. | N/A | N/A | .026, 10 μm gap | N/A |

In examining the results of our calculations, it is useful to calculate the maximum susceptibilities that can be obtained. For an effective index of about 2, which is approximately correct for these waveguides, and a gap size of 20 nm, the maximum achievable γ is approximately 12.5 μm$^{-1}$. Thus, for a gap size of 20 nm, waveguide design 8 is already within 25% of the theoretical maximum value.

It is also worth noting the corresponding γ value that can be obtained by calculation using our methods for the separated electrode approach of Steier. The effective index of the mode is expected to be about 1.8, and the gap distance for the dc field is 10 um. Under the most optimistic assumptions about mode overlap with the active polymer region (that is, assuming complete overlap), this corresponds to a γ of about 0.03 μm$^{-1}$.

It is useful to calculate, given the current $r_{33}$ values that are available, the index tuning that might be achieved with these designs. The most advanced polymers now yield $r_{33}$ values of 500 pm/V. If a bulk refractive index of 1.7 is used, then a ∂n/∂V of 0.006 V$^{-1}$ is obtained with the best design given above. Using a waveguide with an effective index of 2 and a group index of 3, which are typical of silicon-polymer nano-slot waveguides, the $V_\pi$, for a Mach-Zehnder with a length of 1 cm is expected to be about 6 mV. The resonance shift that is expected to be obtained in a ring resonator configuration would be 380 GHz per volt. Both of these values represent orders of magnitude improvement in the performance of these devices compared to current designs.

Segmented Contacting

As we have shown empirically, silicon can be doped to about 0.025 Ω-cm of resistivity with a n-type dopant without substantially increasing losses. Other dopants or perhaps other high index waveguiding materials may have even higher conductivities that can be induced, without significantly degrading optical performance. However, it is known that the conductivity cannot be increased endlessly without impacting optical loss.

This naturally presents a serious challenge for the issue of driving a slot waveguide of any substantial length. Consider a slot waveguide arm of length 1 mm, formed of our optimal design. The capacitor formed by the gap between the two electrodes is about 0.25 pF. The 'down the arm' resistance of the structure, however, is 4 MΩ. Therefore, the turn on time of an active waveguide based on this is about 0.1 μS, implying a 10 MHz bandwidth.

A solution to this problem is presented by continuously contacting the waveguide via a segmented waveguide. This comprises contacting the two silicon ridges with a series of silicon arms. Even though the silicon arms destroy the continuous symmetry of the waveguide, for the proper choice of periodicity no loss occurs, and the mode is minimally distorted. This is because a Bloch mode is formed on the discrete lattice periodicity, with no added theoretical loss. Of course the performance of fabricated devices will be different from that of conventional slot waveguides due to fabrication process differences. We have previously demonstrated empirically that continuous electrical contact can be formed for non-slotted waveguide via segmentation with relatively low optical losses.

Figure 15:
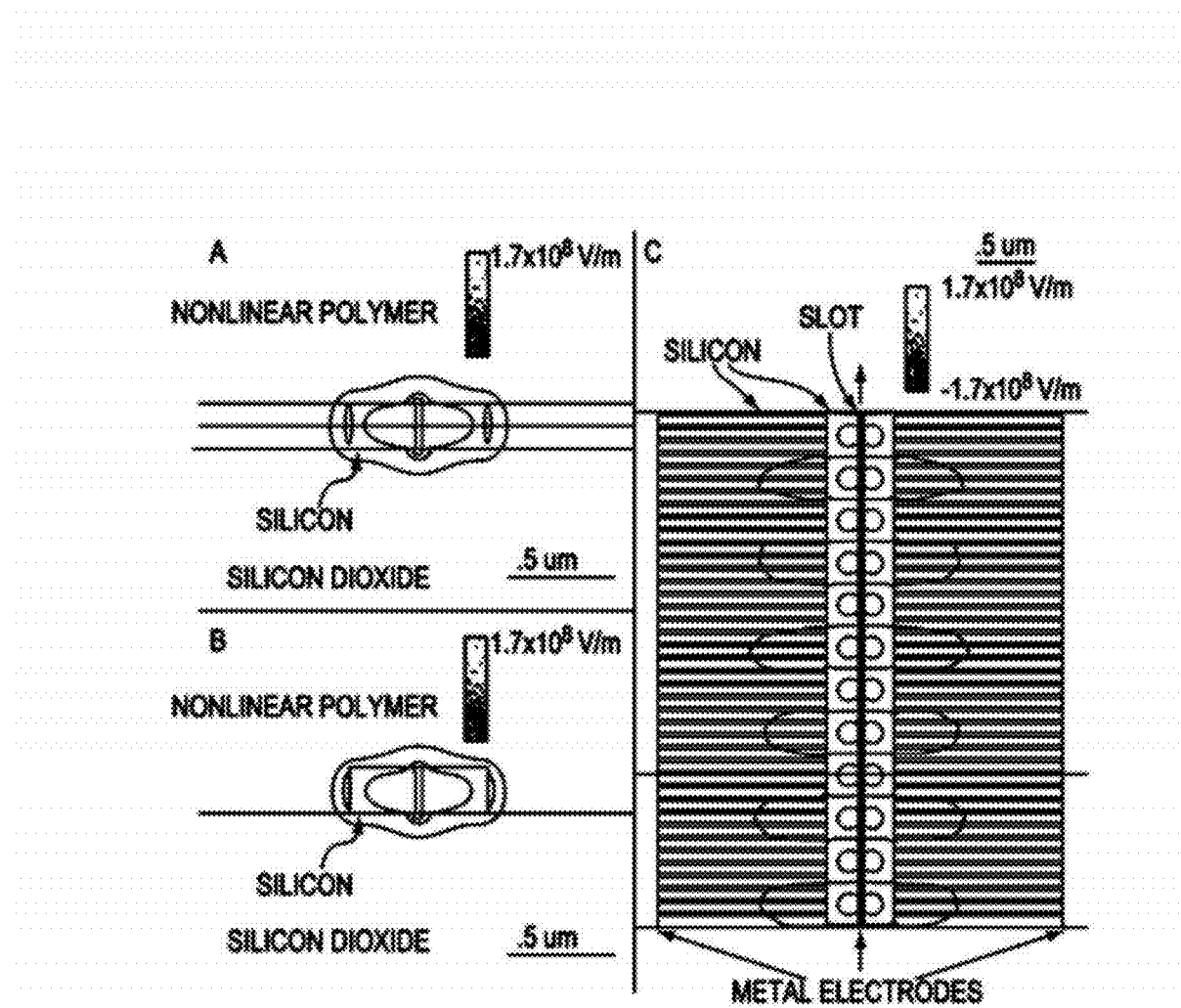
FIG. 15A shows a cross section of the segmented, slotted waveguide, with the |E| field plotted in increments of 10% of max value.
FIG. 15B shows a similar plot for the unsegmented waveguide.
FIG. 15C shows a horizontal cross section of the segmented, slotted waveguide in which Re(Ex) is plotted in increments of 20% of max.

Here we present a simulation of a particular segmentation geometry for our optimal slot waveguide design, that with 200 nm tall and 300 nm wide arms and a gap of 20 nm. We have found that a segmentation with 40 nm arms, and a periodicity of 100 nm, appears to induce no loss or significant mode distortion in the waveguide. Around 2 um of clearance appears to be needed from the edge of the segmented waveguide to the end of the arms. FIG. 15A, FIG. 15B and FIG. 15C show plots of several cross sections of the segmented slot waveguide with a plot of the modal pattern overlaid. For comparison, a cross section of the unsegmented slot waveguide is presented as well. Simulations were also performed to confirm that the index shift formula continued to apply to the segmented slotted waveguide. It was found that the index shift was in approximate agreement with the value predicted for the non-segmented case. Non-segmented modesolvers were used for the rest of the simulations in this work, because simulation of the segmented designs is radically more computationally burdensome than solving for the unsegmented case, as they require solving for the modes of a 3d structure. Since the index shifts for the unsegmented and segmented cases are extremely similar, solving for the modes in the unsegmented cases is adequate for purposes of design and proof-of-concept.

FIG. 15A shows a cross section of the segmented, slotted waveguide, with the |E| field plotted in increments of 10% of max value. FIG. 15B shows a similar plot for the unsegmented waveguide. FIG. 15C shows a horizontal cross section of the segmented, slotted waveguide; Re(Ex) is plotted in increments of 20% of max. In an actual device, some sort of metal based transmission line would undoubtedly provide the driving voltage for the waveguide. The metal electrodes that would likely form part of this transmission line have been noted in FIG. 15C. In all cases the mode has been normalized to have 1 Watt of propagating power. FIG. 15A and FIG. 15C show the location of the other respective cross section as a line denoted C in FIG. 15A and A in FIG. 15C.

Assuming a 0.025 Ω-cm resistivity, one can calculate the outer arm resistance as 63 kΩ per side per period, while the inner arm resistance is 25 kΩ per side per period. The gap capacitance per period is 2.5×10$^{-17}$ Farads. This implies a bandwidth on the order of 200 GHz.

We now describe an electro-optic modulator fabricated from a silicon slot waveguide and clad in a nonlinear polymer. In this geometry, the electrodes form parts of the waveguide, and the modulator driving voltage drops across a 120 nm slot. As a result, a half wave voltage of 0.25 V is achieved near 1550 nm. This is one of the lowest values for any modulator obtained to date. As the nonlinear polymers are extremely resistive, our device also has the advantage of drawing almost no current. It is believed that this type of modulator could operate at exceedingly low power.

A unique advantage with nonlinear polymers is that an integrated optical circuit can be conformally coated by a nonlinear polymer. This property, when combined with a slot waveguide, enables the construction of a uniquely responsive modulator. We describe the use of a push-pull Mach-Zehnder modulator configuration in which each arm has an opposing bias, leading to an opposing phase shift.

Figure 16:
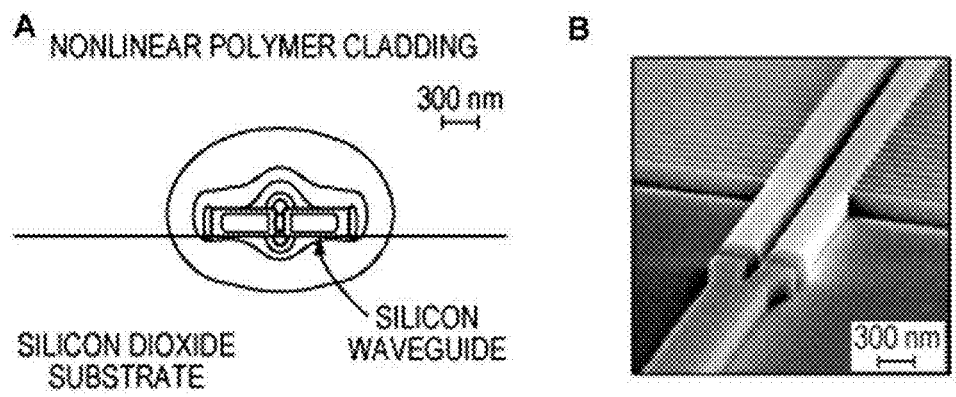
FIG. 16A is a diagram of the silicon slot waveguide used in the Mach-Zehnder modulator, according to principles of the invention.
FIG. 16B is an SEM micrograph of a slot waveguide, according to principles of the invention.

FIG. 16A shows the slot waveguide used for the Mach-Zehnder modulator. The modal pattern near 1550 nm is plotted, and contours of |E| are shown. FIG. 16B is an SEM micrograph of a slot waveguide. In this case, the slot waveguide is being coupled to with a ridge waveguide; this mode converter involves tiny gaps which ensure electrical isolation between the two arms. Contacting arms are also present around 3 μm from the ridge/slot junction. The dimensions are two 300×100 nm arms separated by a 120 nm slot.

Nonlinear polymers typically have very high resistivity of $10^{11}$ Ωcm. As a result, the two silicon arms are electrically isolated and can be used as modulator electrodes. The voltage drop between the arms occurs across a 120 nm electrode spacing, as opposed to the 5-10 μm that is typically required for modulators involving a nonlinear polymer and metallic contacts. This is a fundamental advantage that slot waveguide geometries have for electro-optic modulation.

It is advantageous to contact the silicon arms with an external electrode throughout the length of the Mach-Zehnder device to minimize parasitic resistances. We use a segmented waveguide in which a periodic set of small arms touches both waveguide arms. We use a segmentation with a periodicity of 0.3 μm and arm size of 0.1 μm that is largely transparent to the optical mode.

Figure 17:
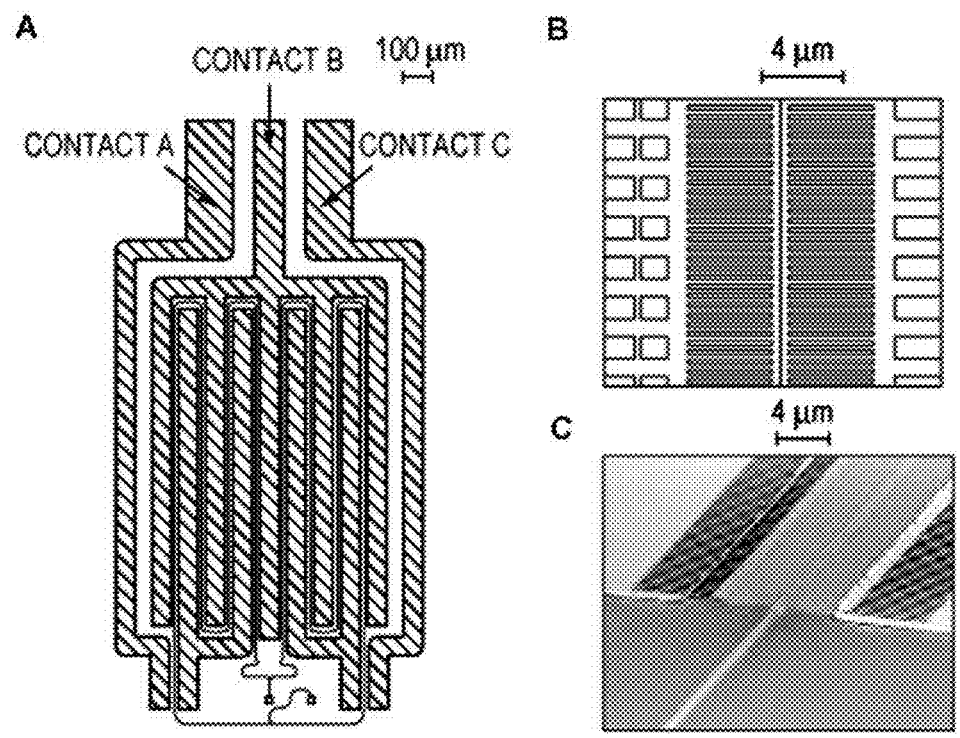
FIG. 17A is a diagram of the modulator layout, according to principles of the invention.
FIG. 17B and FIG. 17C are two SEM micrographs of modulators constructed according to principles of the invention, that show the slotted, segmented region, as well as the location where the silicon makes contact with the electrical layer.

Because the polymer has a second order nonlinearity, a Mach-Zehnder modulator can be operated in push-pull mode, even with no dc bias, effectively doubling the modulator response. FIG. 17A is a diagram of the modulator layout, in which contacts A, B, and C are shown. FIG. 17B is a diagram and FIG. 17C is a SEM micrograph that show the slotted, segmented region, as well as the location where the silicon makes contact with the electrical layer.

Referring to FIG. 17A, there are three regions in the modulator that are capable of maintaining distinct voltages. During poling operation, contact A is given a voltage of $2V_{pole}$, contact B a voltage of $V_{pole}$, and contact C is held at ground. To achieve a poling field of 150 V/μm, $V_{pole}$ was 18 V. This has the effect of symmetrically orienting the polymer in the two Mach-Zehnder arms. During device operation, contact B is driven at the desired voltage, while contacts A and C are both held at ground, leading to asymmetric electric fields in the two arms for a single bias voltage. This is the source of the asymmetric phase response. Electrical regions A and C cross the waveguide by means of a slotted ridged waveguide. At the ridge to slot mode converter, a small gap is left that maintains electrical isolation but is optically transparent. This enables the device to be built without requiring any via layers. A driving voltage from a DC voltage source was applied to contact B, while contacts A and C were held at ground.

Figure 18:
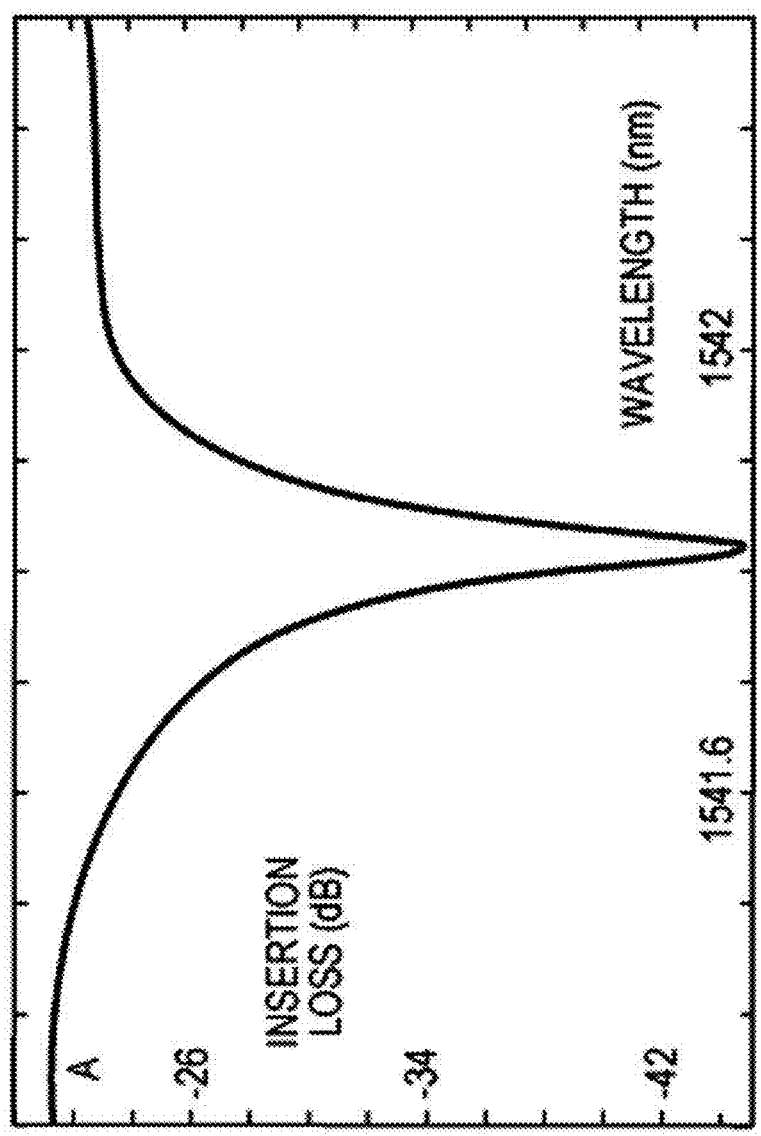
FIG. 18 is a diagram that shows a transmission spectrum of an electroded slot waveguide resonator with a gap of 70 nm. Fiber to fiber insertion loss is plotted in dB, against the test laser wavelength in nm.

We have recently demonstrated empirically that slot sizes of around 70 nm can be fabricated in 110 nm SOI as ring resonators with electrical contacts. FIG. 18 is a diagram that shows a transmission spectrum of an electroded slot waveguide resonator with a gap of 70 nm. Fiber to fiber insertion loss is plotted in dB, against the test laser wavelength in nm. We have also confirmed through electrical measurements that the two halves of the slots are largely electrically isolated.

We believe that there is the possibility of constructing even narrower slot waveguides, on the scale of 1-5 nm in thickness. For example, one could use epitaxial techniques to grow a horizontal slot structure (rather than the vertical structures we have explored thus far) with an active, insulating material, with silicon beneath and above. This could be done in a layer form analogous to SOI wafer technology, in which a very thin layer of electroactive material such as the polymers we have described herein could be introduced. Such structures offer the possibility of yet another order of magnitude of improvement in the low-voltage performance of modulators. We anticipate our slot structures to be fairly robust even in the presence of fabrication errors. Fabrication imperfections may cause some of the narrower slots to have tiny amounts of residual silicon or oxide in their centers, or to even be partially fused in places. As long as electrical isolation is obtained, and the optical loss is acceptable, we would expect the slot performance to decrease only in a linear proportion to the amount of the slot volume that is no longer available to the nonlinear polymer cladding.

Integrated Optics

It has recently emerged that silicon is an ideal material system for integrated optics in the near infrared, particularly for chip-to-chip interconnects at speeds in the gigahertz. We now find ourselves with the opportunity to exploit the massive industrial investment in silicon fabrication and design infrastructure in order to build massively integrated photonic circuits in silicon. For instance, under the DARPA EPIC (Electronic & Photonic Integrated Circuits) program, a single-chip radio-frequency front-end has been developed which replaces two entire 19" racks of conventional RF and photonic components, and provides significantly improved performance. At Luxtera, the first product is a 40-gigabit per second data cable, with electrical connectors, that can transmit bi-directional data over hundreds of meters, is aimed at supercomputing and data center applications. This chip-scale system integrates thousands of optical components including laser sources, modulators and detectors—and hundreds of thousands of transistors, onto a single chip. Further applications massively parallel, multi-terabit per second data transmission through the use of wavelength division multiplexing.

There has been significant progress in both the commercial and academic worlds on building individual optical devices silicon platform, primarily aimed at data transmission applications. Many of the components of a communications system, operating at speeds below 20 gigahertz, have already been demonstrated both academia and in industry. These devices include high-Q optical cavities, electrooptic modulators based on manipulating carrier density, slow-light architectures for optical memory, optically pumped silicon lasers, optical detectors at 1550 nm, optical parametric amplifiers, Raman lasers, optical logic in the high megahertz range, evanescently coupled lasers and a wide variety of photonic crystal based waveguides and resonators, however, the carrier-based modulators built under EPIC and at Luxtera are not suitable for low-noise analog applications since they require significant bias voltages, and their linearity is likely to be inadequate.

Nanostructured silicon photonic waveguides provide a remarkable platform for nonlinear optics. Polymerclad slot guides have been used to create a variety of high performance devices, including in particular the world's lowest-voltage electro-optic modulators, optical rectification based detectors and Pockels' Effect based ring modulators, and all-optical modulators with more than 1 THz of signal bandwidth.

Figure 19:
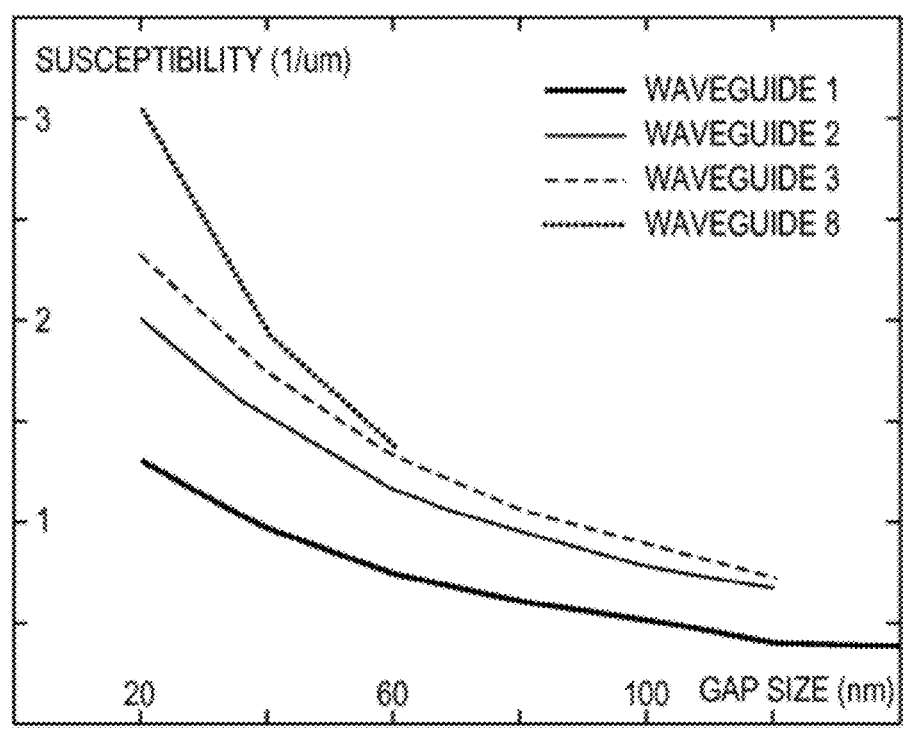
FIG. 19 shows a graph of susceptibility (1/μm) plotted against gap size in nm for several exemplary waveguides.

We have developed silicon waveguides which can be evanescently coupled to a variety of cladding materials. In particular, we have developed nano-slot wave guides that are clad with electrooptic and Kerr effect nonlinear optical polymers. As the slot width decreases, the performance of the modulator improves. FIG. 19 shows a graph of susceptibility (1/μm) plotted against gap size in nm for several exemplary waveguides. Such polymers exhibit nonlinear optical properties that are as much as an order of magnitude stronger than conventional nonlinear optical materials, such as Lithium Niobate, and are believed to be the strongest ultrafast nonlinear optical materials by an order of magnitude. The slot waveguides, because of their nanoscale features, concentrate optical modes into areas that are orders of magnitude smaller than those of single mode optical fibers. Their enormous concentration of optical energy, located in the slot, translates into a dramatic enhancement of the electric field associated with the optical mode. This enhanced field is located not in the silicon, but in the slot region, which is filled with electrooptic organic material with greatly enhanced optical nonlinearity. As a result, the figure of merit associated with these waveguides, when filled with active nonlinear materials, is believed to be orders-of magnitude higher than that achieved in any alternative system.

Figure 20:
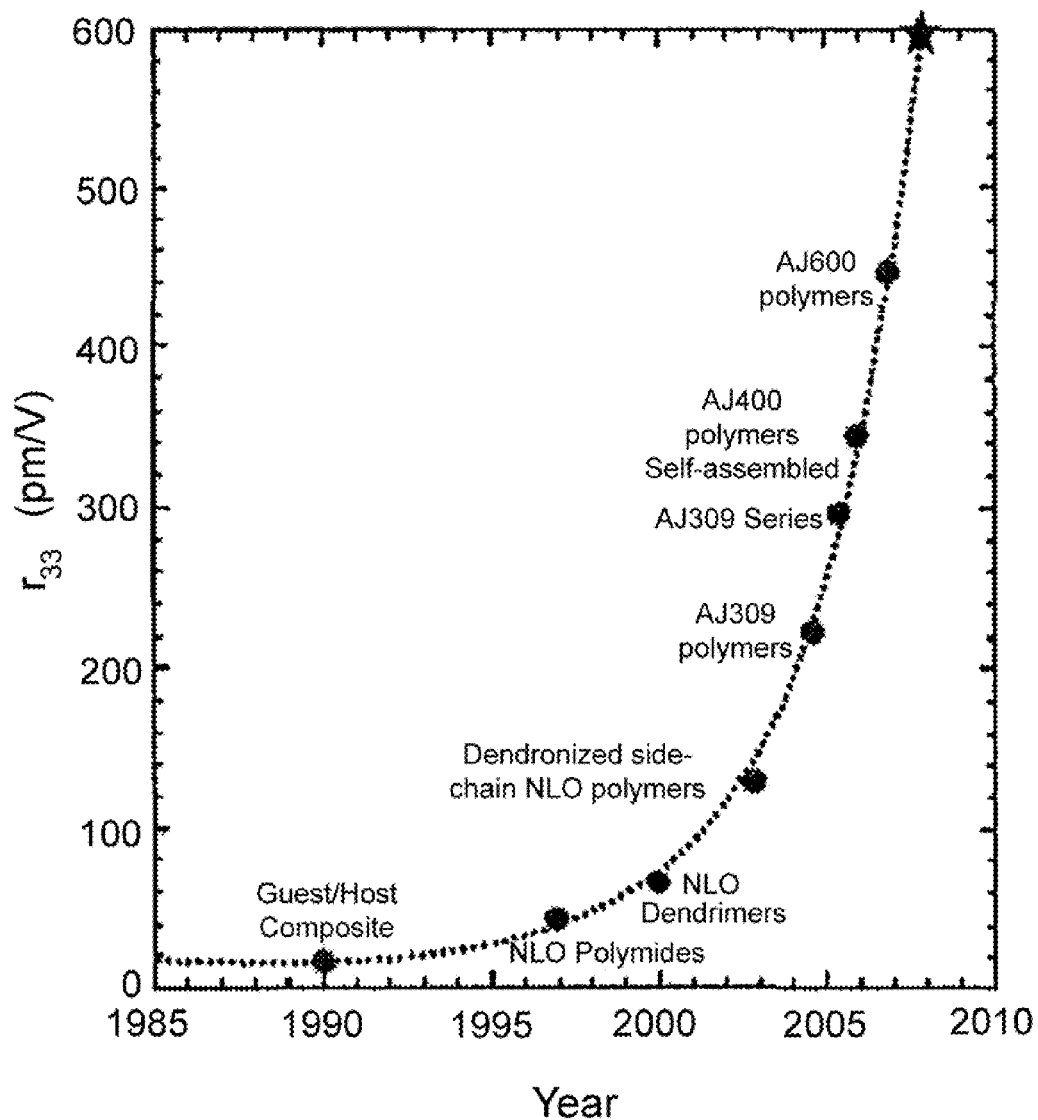
FIG. 20 shows a graph of the evolution of optical materials plotted as $r_{33}$ electro-optic activity in pm/V versus the year of development.

The electro-optic activity of engineered organic materials has followed an exponential curve over the past decade, making them now the most nonlinear ultrafast optical materials. Organic materials are typically more than an order of magnitude stronger than lithium niobate, the most common nonlinear optical material in use today. FIG. 20 shows a graph of the evolution of optical materials plotted as $r_{33}$ electro-optic activity in pm/V versus the year of development.

An additional advantage of the silicon system comes from the ability to straightforwardly fabricate many devices within the same chip, and to use lithography to align them together. As a result, there is only one optical alignment needed in packaging the devices; it is possible to address an entire optical system with a single fiber array connecting to the outside world. By integrating multiple devices onto the same chip, a single optical alignment can be used to address hundreds or even thousands of different optical components, all of which can comprise a single complex system.

Split Waveguides and Optical Polymers

We have developed a set of tools for concentrating light to a high degree by using silicon or other high index contrast waveguides, and we have fabricated devices that demonstrate some of the many applications that can be contemplated when such nonlinear materials are exploited. In particular, by utilizing split waveguides, we are able to greatly enhance the optical fields in the cladding of a tightly confined waveguide, without greatly enhancing the optical losses of the same waveguide. Combining the high field concentrations available from the split waveguides with the high nonlinear activity of nonlinear optical polymers permits the development of nonlinear optical devices which can operate at much lower optical input power levels than are possible with conventional free space or chip based systems. We have demonstrated four-wave mixing (which is based upon $\chi^3$), as well as optical rectification (based on $\chi^2$), in such waveguides. Using these waveguides it is possible to decrease the power levels needed to observe significant nonlinearities to the point where, by contrast with conventional nonlinear optics, it can be done with non-pulsed, continuous wave lasers.

Prior Art Electro-Optic Modulators

Electro-optic (E-O) modulators serve as the gateway between the electrical and optical domains, and as such, are a component in many radio frequency systems. Today, such modulators are primarily made out of Lithium Niobate. Commercial Lithium Niobate devices typically require around 3 volts for full extinction drive at speeds of 30 GHz, with around 4 dB of loss. Because of the relatively high full extinction voltage, additional amplifiers are needed to drive Lithium Niobate modulators. These additional amplifiers can be a significant source of nonlinearity in high-speed analog systems.

Silicon Waveguides

We have developed silicon waveguides which can be evanescently coupled to a variety of cladding materials. In particular, we have developed nano-slot wave guides that are clad with electrooptic and Kerr effect nonlinear optical polymers. Such polymers exhibit nonlinear optical properties that are as much as an order of magnitude stronger than conventional nonlinear optical materials, such as Lithium Niobate, and are to our knowledge, the strongest ultrafast nonlinear optical materials in the world by an order of magnitude. The slot waveguides, because of their nanoscale features, concentrate optical modes into areas that are orders of magnitude smaller than those of single mode optical fibers. Their enormous concentration of optical energy, located in the slot, translates into a dramatic enhancement of the electric field associated with the optical mode. This enhanced field is located not in the silicon, but in the slot region, which is filled with electrooptic organic material with greatly enhanced optical nonlinearity. As a result, the figure of merit associated with these waveguides, when filled with active nonlinear materials, is orders-of magnitude higher than that achieved in any alternative system. An additional advantage of the silicon system comes from the ability to straightforwardly fabricate many devices within the same chip, and to use lithography to align them together. As a result, there is only one optical alignment needed in packaging the devices and it is possible to address an entire optical system with a single fiber array connecting to the outside world. By integrating multiple devices onto the same chip, a single optical alignment can be used to address hundreds or even thousands of different optical components, all of which can comprise a single complex system.

Silicon-Polymer Modulator

We are also developing a silicon-polymer modulator at 20 GHz, with a 250 mV drive voltage. For purposes of comparison, today's typical 30 GHz modulators provide approximately −1 dB of E-O power gain when operating with 500 mW of input power. It is contemplated that such devices can eventually offer up to as much as about 44 dB of gain from the E-O transition, at 100 GHz bandwidth. The availability of such modulators will result in a radical re-engineering of a variety of military and civilian analog data communication system. We have recently found, very surprisingly, that by making the slot smaller, a 14 μm geometry increases the modulation effect, so that the modulation strength is nearly inversely proportional to the size of the gap. The reason this increases the modulation effect is that even for slots as small as 0.02 μm, the TE optical mode will still be largely concentrated in the central slot. This implies that nearly an additional order of magnitude in modulation enhancement can be obtained over the performance previously demonstrated. When combined with recent developments of nonlinear polymers with $r_{33}$ values of 130 pm/V and 500 pm/V, it is contemplated that a modulator with a $V_\pi$-L on the order of 4 mV-cm, and that resonators with a tunability of 0.5 THz/V can be built, which would represent a substantial enhancement over the current state of the art. It is contemplated that this work will use advanced device fabrication as well as integration of advanced electrooptic organic materials. FIG. rr shows a grazing-angle SEM image of one exemplary silicon slot waveguide and resonator, a slot ring resonator directional coupler region, and the associated input waveguide.

Electro-Optic Materials

The DARPA Super Molecular Photonics (MORPH) program is an exploratory effort to demonstrate that engineered molecular nano-systems can achieve increases in optical nonlinearity. The best organic electrooptic materials developed so far under the MORPH program provide electrooptic activity of approximately 600 pm/V. An electrooptic activity of approximately 600 pm/V is believed to be adequate for fabrication of the devices and systems described herein. Significant challenges exist (e.g. challenges with poling and charge injection at the surfaces) in integrating these high activity materials into the silicon slot waveguide system. The highest activity that has been realized to date in a slot guide is around 30 pm/volt. It has emerged that poling in these nanoscale waveguides is a significantly different problem from that of poling larger all-organic or sol-gel/organic devices. It is contemplated that charge injection can be controlled by varying doping levels and surface coatings on the slot guides (probably through the use of atomic layer deposition). In addition, it is contemplated that organic materials can be engineered to adapt them to the silicon waveguide system and to improve the stability of the most active materials.

Low Drive Voltage Modulator

Figure 21:
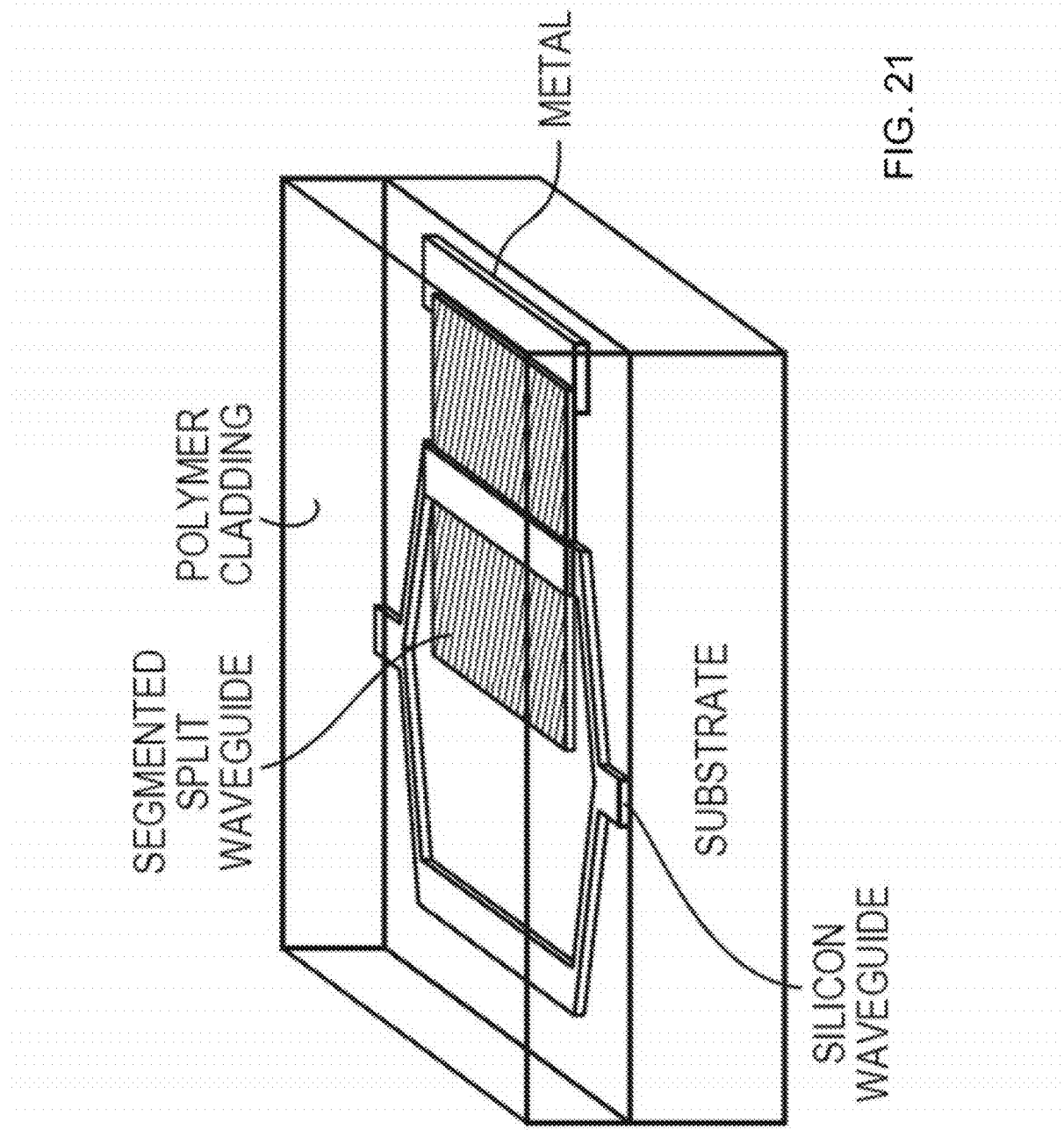
FIG. 21 shows a three dimensional sketch of an exemplary slot waveguide modulator.

As introduced hereinabove, one exemplary low drive voltage modulator that is suitable for use in the inventive devices and systems described herein. FIG. 21 shows a three dimensional sketch of an exemplary slot waveguide modulator. FIG. 16A shows one exemplary slot waveguide used for the Mach-Zehnder modulator of a low drive voltage modulator. The modal pattern near 1550 nm is plotted, and contours of |E| are shown. FIG. 16B shows an SEM micrograph of a slot waveguide. The slot waveguide is coupled to a ridge waveguide. A mode converter involves tiny gaps which ensure electrical isolation between the two arms. Contacting arms are also present around 3 μm from the ridge/slot junction. The dimensions are two 300 nm×100 nm arms separated by a 120 nm slot.

Because nonlinear polymers typically have a very high resistivity of $10^{11}$ Ω-cm, the two silicon arms are electrically isolated and can be used as modulator electrodes. The voltage drop between the arms occurs across a 120 nm electrode spacing, as opposed to the 5-10 μm that is typically required for modulators involving a nonlinear polymer and metallic contacts. This nm electrode spacing offers a fundamental advantage that slot waveguide geometries have for electro-optic modulation.

Also, it is advantageous to contact the silicon arms with an external electrode throughout the length of the Mach-Zehnder device to minimize parasitic resistances. We use a segmented waveguide in which a periodic set of small arms touches both waveguide arms. One suitable segmentation, which is largely transparent to the optical mode, has a periodicity of 0.3 μm and arm size of 0.1 μm. Because the polymer has a second order nonlinearity, a Mach-Zehnder modulator can be operated in a push-pull mode, even with no dc bias, effectively doubling the modulator response.

We have recently demonstrated empirically that slot sizes of around 70 nm can be fabricated in 110 nm SOI as ring resonators with electrical contacts. Fiber to fiber insertion loss is plotted in dB, against the test laser wavelength in nm. We have also confirmed through electrical measurements that the two halves of the slots are largely electrically isolated.

It is contemplated that even narrower slot waveguides, on the scale of 1-5 nm in thickness, can be built. For example, one could use epitaxial techniques to grow a horizontal slot structure (rather than the vertical structures we have explored thus far) with an active, insulating material, with silicon beneath and above. This could be done in a layer form analogous to SOI wafer technology, in which a very thin layer of electroactive material such as the polymers we have described herein could be introduced. Such structures offer the possibility of yet another order of magnitude of improvement in the low-voltage performance of modulators. We anticipate our slot structures to be fairly robust even in the presence of fabrication errors. Fabrication imperfections may cause some of the narrower slots to have tiny amounts of residual silicon or oxide in their centers, or to even be partially fused in places. However, as long as electrical isolation is obtained, and the optical loss is acceptable, we would expect the slot performance to decrease only in a linear proportion to the amount of the slot volume that is no longer available to the nonlinear polymer cladding.

The description provided herein can be augmented by the descriptions provided in the following patents and pending patent applications: U.S. Pat. Nos. 7,200,308, 7,424,192, U.S. Patent Application Publication No. 2009/0022445A1, U.S. patent application Ser. No. 12/167,063, PCT/US2009/335 16, and PCT/US2009/36128, all of which patents and applications are incorporated herein by reference in their entirety for all purposes.

Device Geometries for Enhancing Electrooptic Modulation

We now describe embodiments of slot waveguides with various embodiments of device geometries for enhancing electrooptic modulation. In general, one of the challenges with slot waveguide based modulators is the need to electrically contact each arm (typically silicon) of the slot waveguide with a low resistance electrical path. However, by proper selection of arm height, the slot arms can be connected electrically with minimal or no optical loss. While generally conveying the geometries and configurations of the slot waveguides, the following drawings may illustrate waveguides having features that are not to scale.

Figure 22:
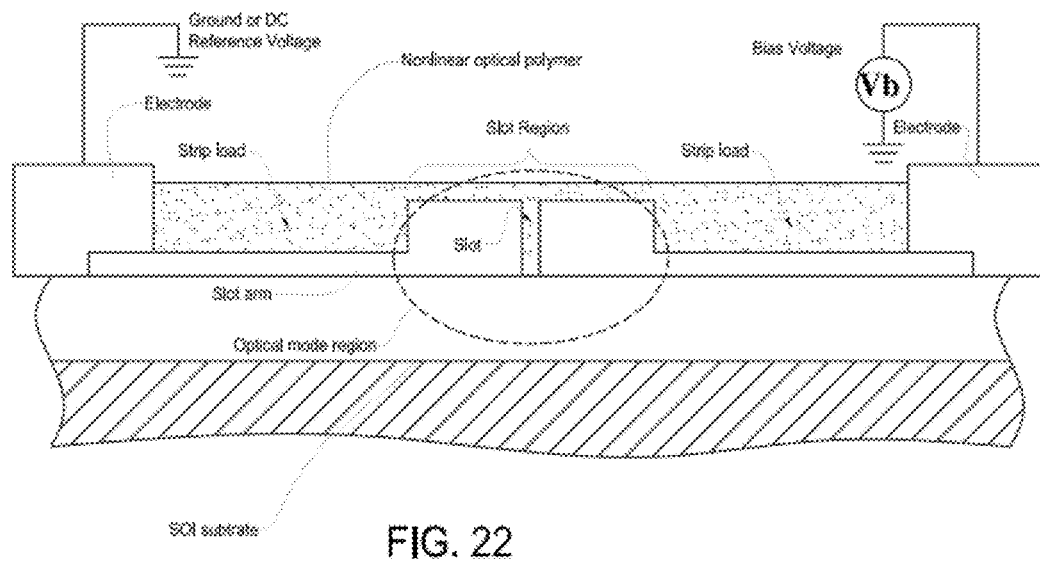
FIG. 22 shows a schematic diagram of an embodiment of a slot waveguide that is configured to carry optical mode of optical radiation and to modulate the optical radiation.

FIG. 22 shows a schematic diagram of an embodiment of a slot waveguide that is configured to carry an optical mode of optical radiation and to modulate the optical radiation. The slot arms are strip loaded, having a nonlinear optical polymer covering the strip loaded portions of the slot arms. Embodiments of the slot arms can be unsegmented (not visible in FIG. 22). Other embodiments of the slot waveguide, however, can include segmented portions (see, e.g., the segmented waveguide structure of FIG. 9, which illustrates a segmented waveguide structure with slot arms that do not have an "L-type" shape or decreased height relative to the slot region). As shown, the slot arms of the waveguide are positioned on the surface of a silicon oxide layer of an SOI substrate. In other embodiments, however, other types of substrates or other configurations of substrates may be employed to carry the slot arms.

To provide electrooptic modulation, the slot arms are coupled to electrical contacts. The slot arms allow bias voltage, applied at the electrical contacts, to appear in the slot region. Note that the bias voltage may be a voltage due to an RF signal. The turn on time in such a configuration can be 20 GHz or higher due to the highly conductive slot arms.

Figure 23:
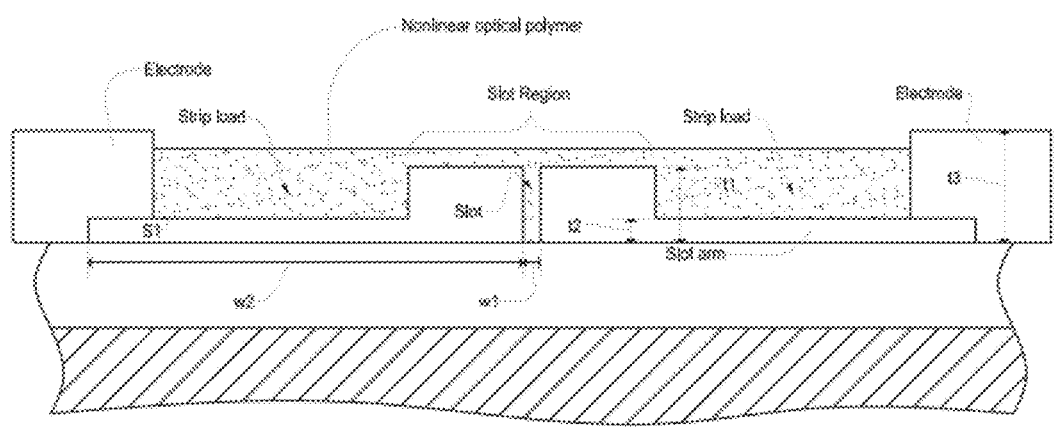
FIG. 23 shows a schematic diagram of a slot waveguide that identifies embodiments of configurations for providing optical ranges near the 1.55 um free space wavelength.
Figure 24:
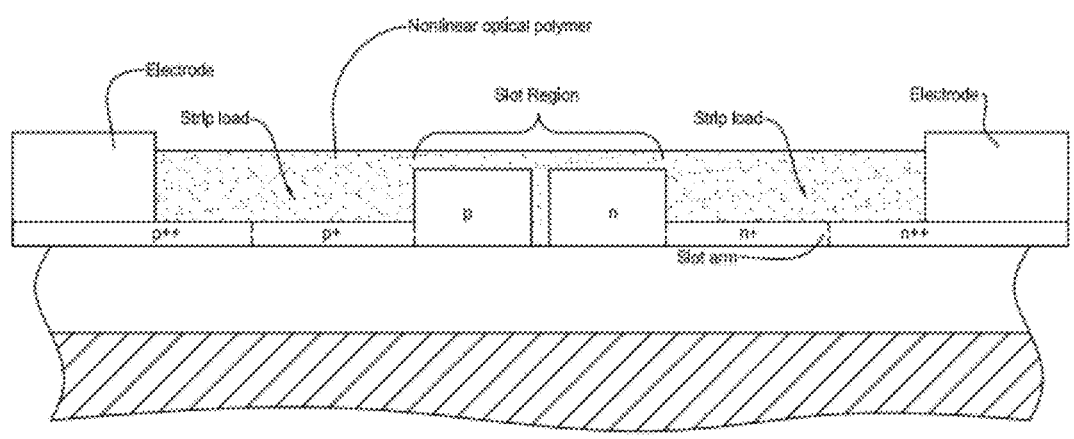
FIG. 24 shows a schematic diagram of a slot waveguide having a dopant profile with different types of dopants.

FIG. 23 shows a schematic diagram of a slot waveguide that identifies embodiments of configurations for providing optical ranges near the 1.55 um free space wavelength. In general, optical radiation ranging from 1300-1700 nm free space wavelength is typically considered close to 1.55 um, though radiation even further from 1.55 um can often work with the inventive waveguide. Slot width w1 ranges from 10 to 400 nm and arm width w2 ranges from 200 to 300 mm. The height t1 of the slot arms in the slot region ranges from 100 to 600 nm. The height t2 of the slot arms in the strip load region ranges from 10 to 250 nm. The nonlinear polymer can have a refractive index ranging from 1.5 to 1.9 and beyond. In one embodiment, the nonlinear polymer is a $\chi^2$ material. The electrodes can have a height t3 of 1.5 um, and they can include metal, such as aluminum. In one embodiment, the electrodes at least partially project over a surface s1 of the slot arms. In another embodiment, the electrodes are positioned entirely on the slot arms (see, e.g., FIG. 24 showing the slot arms extending under the electrodes). In one embodiment, a silicide region (not shown) is located between an individual electrode and an individual slot arm for providing an ohmic contact.

The dopant used in the slot arms can be configured to control device performance. In one embodiment, the dopant profile may be n-type in both arms, such as phosphorous. Alternatively, both arms may be p-type, such as boron. In some embodiments, an n-type dopant is used in one arm and a p-type dopant is used in the other arm. In one embodiment, this type of dopant profile configuration can be helpful for achieving polymer poling. In general, one of the challenges with $\chi^2$ polymer based devices is that they must have their nonlinear moments oriented in a single direction in order to allow modulation to occur. The difference in height in the Fermi level of each arm may help in poling some polymers.

FIG. 24 shows a schematic diagram of a slot waveguide having a dopant profile with different types of dopants. One of the slot arms has a p-type dopant in the slot region and increasingly larger dopant concentration closer to the electrode, denoted by p+ and p++, respectively. The other slot arm has a similar doping profile, but with n-type dopant in the slot region and the strip load region. The increased dopant concentration can minimize the optical mode overlap with the higher doped regions, and thus minimize optical loss. Typical dopant concentrations near each electrode may be on the order of $10^{17}$ cm$^{-3}$.

Figure 25A:
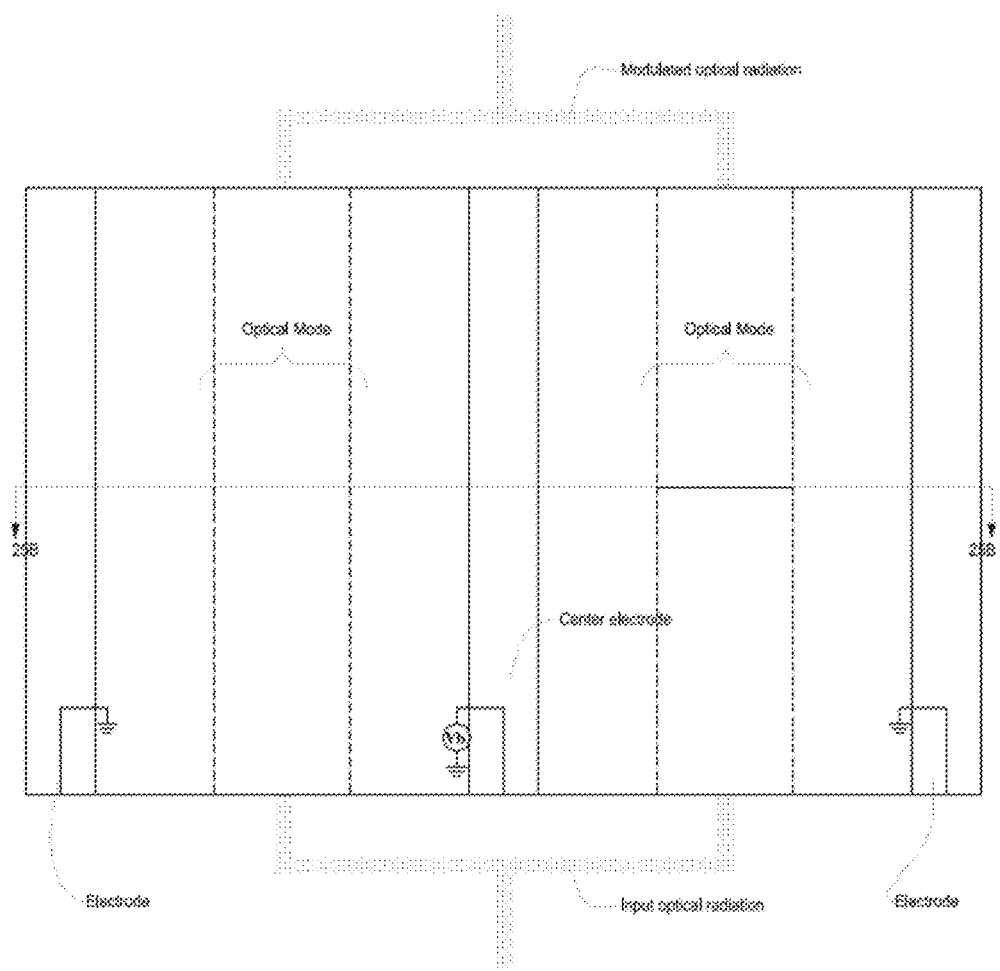
FIGS. 25A and 25B are schematic diagrams, showing, respectively, a top plan view and a corresponding cross-sectional view of a Mach-Zehnder modulator that incorporates one or more embodiments of the inventive slot waveguide.
Figure 25B:
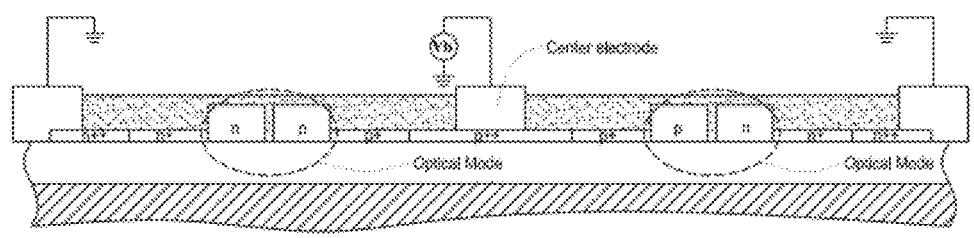

FIGS. 25A and 25B are schematic diagrams, showing, respectively, a top plan view and a corresponding cross-sectional view of a Mach-Zehnder modulator that incorporates one or more embodiments of the inventive slot waveguide. In particular, the Mach-Zehnder modulator incorporates two slot waveguides that share a common center electrode. As shown, each of the slot waveguides receives input optical radiation and outputs modulated optical radiation. In one embodiment, each of the slot waveguides is coupled to a ridge waveguide for communicating optical radiation to/from the Mach-Zehnder modulator. In one embodiment, the Mach-Zehnder modulator can be employed with light near 1.55 um in free-space wavelength. In other embodiments, however, other wavelengths are possible.

In the embodiment of FIG. 25B, the slot waveguides have an n/p/p/n doping profile. In other embodiments, however, a variety of other permutations on doping type and/or concentrations are possible. For example, one of the slot waveguides may have slot arms that are p-type, while the other waveguide has slot arms that are n-type.

In one embodiment, the center electrode can receive a bias voltage and the other, flanking electrodes can receive a ground, DC, or other reference potential. In one embodiment, the nonlinear polymer can be poled via the electrodes. For example, the nonlinear polymer can be poled in opposing directions in each slot arm. As a result, a positive bias in the center electrode will results in a positive phase shift in the left slot waveguide and a negative phase shift in the right slot waveguide.

Figure 26:
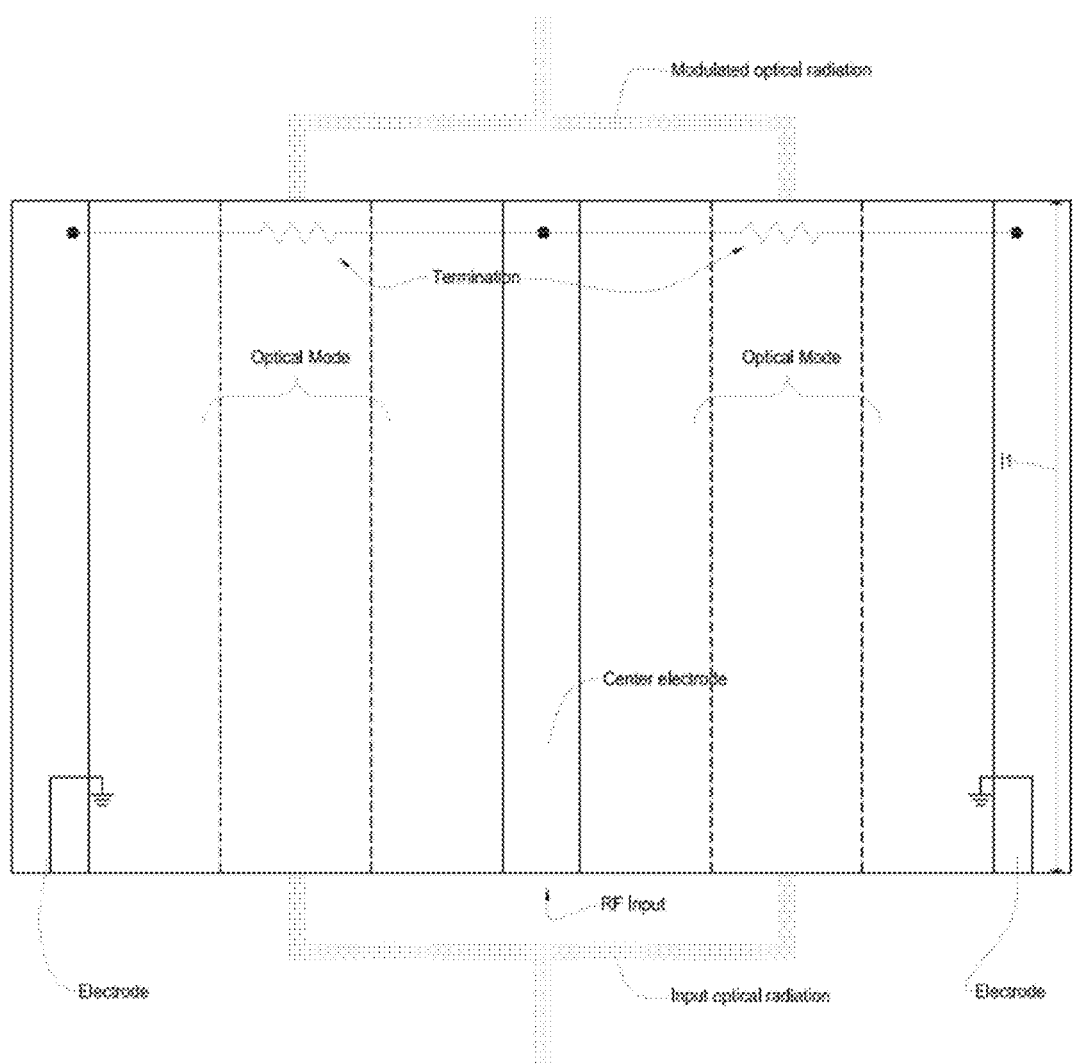
FIG. 26 is a schematic diagram of a travelling-wave Mach-Zehnder modulator that incorporates one or more embodiments of the inventive slot waveguide.

For small Mach-Zehnder devices, the equivalent RF circuit can be treated as a lumped element. But longer devices, perhaps 0.5 cm or more, should be built as transmission lines. FIG. 26 is a schematic diagram of a travelling-wave Mach-Zehnder modulator that incorporates one or more embodiments of the inventive slot waveguide. In this configuration, the length 11 of the modulator is 0.5 cm or greater. Also, the phase velocity of the optical radiation and the RF radiation is to be matched, enabling the phase shift to build up over the course of the entire device. As a result, strip-loaded slot waveguide modulators can be built that are in excess of 0.5 cm, perhaps as long as 2-4 cm or beyond.

Other Applications

It is believed that the availability of low drive voltage modulator as described herein above, especially in their higher-bandwidth implementations, will result in a radical re-engineering of a variety of analog data communication systems (including both military and civilian applications). Making a high-gain E-O-E (electro-optic effect) transition practical will mean that much lower noise and power consumption will become practical, in particular for antenna-remoting applications. The possibility of building many of these modulators on a single chip opens up a number of new possibilities, including the use of multi-modulator devices to increase linearity of and the creation of low-power chip-scale phased array optical devices for beam steering.

The low power consumption of these devices makes them extremely appealing for data communication in multicore CPU architectures, where hundreds or thousands of modulators would be needed on a single chip; and their low voltage operation opens up entirely new possibilities in areas as diverse as radar systems, imaging, signal processing, and microwave photonics.

With regard to sensor applications, it is believed that the low drive voltage modulator devices described herein and in our related applications and patents cited hereinabove are be beyond the state of the art by orders of magnitude in both speed and sensitivity. For example, it is contemplated that such devices can be used for the probing of RF transmission lines on printed circuit boards where today's approaches tend to require placing probes directly into the signal path, which tends to change the performance of the device under test. With a non-contact or contactless approach, these problems can be greatly reduced. In addition, as described hereinabove, low drive voltage modulator devices are likely to be revolutionary when used for detecting the small electrical fields associated with neural sensing experiments. For example, electric field sensors, including arrays of integrated electric field sensors, as described herein above, can be configured as neural sensors to receive mammalian neural signals.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A slot waveguide configured for providing electrooptic modulation, comprising
    a substrate having a surface;
    electrical contacts coupled to the surface of the substrate;
    a waveguide adjacent the surface of the substrate and coupled between the electrical contacts, the waveguide including a first arm and a second arm that are arranged to define a slot region for confining an optical mode, the slot region having a height t1, and each of the first arm and the second arm including a strip load region having a height that is less than the height t1 of the slot region and being configured to provide an electrical signal to the slot region via at least one of the electrical contacts; and
    a nonlinear optical material positioned in the slot region of the waveguide.

2. The slot waveguide of claim 1, wherein the nonlinear optical material includes a $\chi^2$-based material.

3. The slot waveguide of claim 1, wherein each of the first arm and the second arm have an "L"-type shape.

4. The slot waveguide of claim 1, wherein the substrate includes silicon and silicon oxide positioned between the silicon and the waveguide.

5. The slot waveguide of claim 1, wherein the slot region includes a slot positioned between the first arm and the second arm, and wherein the nonlinear optical material is positioned in the slot.

6. The slot waveguide of claim 1, wherein the slot has a width in the range of 10 nm to 400 nm.

7. The slot waveguide of claim 1, wherein the height of each of the strip load regions is in the range of 10 to 250 nm, and the height t1 of the slot region is in the range of 100 to 600 nm.

8. The slot waveguide of claim 1, wherein the electrical contacts at least partially project over a surface of the first arm and another surface of the second arm.

9. The slot waveguide of claim 1, wherein the electrical contacts include metal, and wherein the electrical contacts have a height of at least 1 um.

10. The slot waveguide of claim 1, wherein the electrical contacts are configured to provide a modulating voltage via each of the first arm and the second arm.

11. The slot waveguide of claim 1, wherein the strip load region of the first arm includes a p-type portion and the strip load region of the second arm includes an n-type portion.

12. The slot waveguide of claim 1, wherein the p-type portion includes any of: a p+ portion and a p++ portion between the p+ portion and one of the electrical contacts, and wherein the n-type portion includes an n+ portion and an n++ portion between the n+ portion and another one of the electrical contacts.

13. The slot waveguide of claim 1, wherein the slot region includes an n-type region and a p-type region separated from the n-type region by a slot.

14. A Mach-Zehnder device, comprising the slot waveguide of claim 1.

15. The Mach-Zehnder device of claim 14, further comprising another waveguide adjacent the waveguide, the other waveguide having arms defining another slot region, the arms having a height that is less than a height of the other slot region.

16. The Mach-Zehnder device of claim 15, wherein the waveguide has strip load regions of different doping type and the other waveguide has strip load regions of different doping type, and wherein the strip load regions of the waveguide and the other waveguide have an n/p/p/n doping profile or a p/n/n/p doping profile.

17. The Mach-Zehnder device of claim 15, wherein the electrodes include a center electrode arranged to provide an electrical potential to a node between the slot region of the waveguide and the other slot region of the other waveguide.

18. The Mach-Zehnder device of claim 17, wherein the electrodes further include a first electrode arranged to provide a reference potential to the waveguide and a second electrode arranged to provide the reference potential to the other waveguide such that a positive bias in the center electrode results in a positive phase shift in the waveguide and a negative phase shift in the other waveguide.

19. The Mach-Zehnder device of claim 14, wherein the electrodes are arranged in a travelling wave configuration for a frequency between 500 MHz and 5 THz.

20. The Mach-Zehnder device of claim 19, wherein the electrodes have a length of 0.5 cm or greater.

* * * * *